(12) United States Patent
Olshansky et al.

(10) Patent No.: US 12,321,694 B2
(45) Date of Patent: *Jun. 3, 2025

(54) USER INTERFACE AND SYSTEMS FOR DOCUMENT CREATION

(71) Applicant: On Time Staffing Inc., Golden Valley, MN (US)

(72) Inventors: Roman Olshansky, Plymouth, MN (US); Thomas Lecy, Minnetonka, MN (US)

(73) Assignee: On Time Staffing Inc., Golden Valley, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/444,041

(22) Filed: Feb. 16, 2024

(65) Prior Publication Data

US 2024/0311553 A1 Sep. 19, 2024

Related U.S. Application Data

(63) Continuation of application No. 17/831,264, filed on Jun. 2, 2022, now Pat. No. 11,907,652.

(51) Int. Cl.
*G06F 40/174* (2020.01)
*G06F 3/04847* (2022.01)
*G06F 40/103* (2020.01)

(52) U.S. Cl.
CPC ........ *G06F 40/174* (2020.01); *G06F 3/04847* (2013.01); *G06F 40/103* (2020.01)

(58) Field of Classification Search
CPC ... G06F 40/174; G06F 40/103; G06F 3/04847
See application file for complete search history.

(56) References Cited

U.S. PATENT DOCUMENTS

| 1,173,785 A | 2/1916 | Deagan |
| 1,686,351 A | 10/1928 | Spitzglass |

(Continued)

FOREIGN PATENT DOCUMENTS

| AU | 2002310201 | 3/2003 |
| AU | 2007249205 | 3/2013 |

(Continued)

OTHER PUBLICATIONS

"Air Canada Keeping Your Points Active Aeroplan," https://www.aircanada.com/us/en/aco/home/aeroplan/your-aeroplan/inactivity-policy.html, 6 pages.

(Continued)

*Primary Examiner* — Shahid K Khan
(74) *Attorney, Agent, or Firm* — Pauly, DeVries Smith & Deffner LLC

(57) ABSTRACT

Various embodiments include a method for document creation. The method can include presenting a frame, presenting a first portion of a first collection of data, receiving a denial of the first portion of the first collection for the first group, presenting a first portion of a second collection of data for the first group, receiving a confirmation of the second collection for the first group, presenting a second portion of the first collection of data, receiving a confirmation or a denial of the second portion of the first collection for the second group, presenting a second portion of the second collection of data for the second group, after receiving a denial of the second portion of the first collection, receiving a confirmation of the second portion of the second collection for the second group, compiling confirmed portions of data into a prose output, and presenting the prose output.

16 Claims, 33 Drawing Sheets

(56) References Cited

U.S. PATENT DOCUMENTS

| | | | |
|---|---|---|---|
| 3,152,622 | A | 10/1964 | Rothermel |
| 3,764,135 | A | 10/1973 | Madison |
| 4,736,308 | A * | 4/1988 | Heckel .................. G06F 3/0481 |
| | | | 715/764 |
| 5,109,281 | A | 4/1992 | Kobori et al. |
| 5,293,615 | A * | 3/1994 | Amada .................. G06F 40/18 |
| 5,410,344 | A | 4/1995 | Graves et al. |
| 5,495,565 | A | 2/1996 | Millard et al. |
| 5,544,360 | A | 8/1996 | Lewak et al. |
| 5,574,843 | A * | 11/1996 | Gerlach, Jr. .............. G06F 8/34 |
| | | | 715/835 |
| 5,608,898 | A * | 3/1997 | Turpin .................. G06F 40/174 |
| 5,628,004 | A * | 5/1997 | Gormley ................ G06Q 30/06 |
| 5,675,788 | A | 10/1997 | Husick et al. |
| 5,732,221 | A | 3/1998 | Feldon et al. |
| 5,754,636 | A * | 5/1998 | Bayless .................. H04M 1/56 |
| | | | 379/142.1 |
| 5,835,667 | A | 11/1998 | Wactlar et al. |
| 5,867,209 | A | 2/1999 | Irie et al. |
| 5,884,004 | A | 3/1999 | Sato et al. |
| 5,886,967 | A | 3/1999 | Aramaki |
| 5,897,220 | A | 4/1999 | Huang et al. |
| 5,906,372 | A | 5/1999 | Recard |
| 5,937,138 | A | 8/1999 | Fukuda et al. |
| 5,949,792 | A | 9/1999 | Yasuda et al. |
| 6,128,414 | A | 10/2000 | Liu |
| 6,229,904 | B1 | 5/2001 | Huang et al. |
| 6,275,813 | B1 * | 8/2001 | Berka .................... G06Q 40/02 |
| | | | 705/30 |
| 6,289,165 | B1 | 9/2001 | Abecassis |
| 6,484,266 | B2 | 11/2002 | Kashiwagi et al. |
| 6,502,199 | B2 | 12/2002 | Kashiwagi et al. |
| 6,504,990 | B1 | 1/2003 | Abecassis |
| RE37,994 | E | 2/2003 | Fukuda et al. |
| 6,598,059 | B1 | 7/2003 | Vasudevan et al. |
| 6,600,874 | B1 | 7/2003 | Fujita et al. |
| 6,618,723 | B1 | 9/2003 | Smith |
| 6,651,217 | B1 | 11/2003 | Kennedy et al. |
| 6,928,623 | B1 * | 8/2005 | Sibert .................... G06F 3/0481 |
| | | | 715/802 |
| 6,981,000 | B2 | 12/2005 | Park et al. |
| 7,095,329 | B2 | 8/2006 | Saubolle |
| 7,146,627 | B1 | 12/2006 | Ismail et al. |
| 7,216,292 | B1 | 5/2007 | Snapper et al. |
| 7,293,275 | B1 | 11/2007 | Krieger et al. |
| 7,313,539 | B1 | 12/2007 | Pappas et al. |
| 7,336,890 | B2 | 2/2008 | Lu et al. |
| 7,343,551 | B1 | 3/2008 | Bourdev |
| 7,499,918 | B2 | 3/2009 | Ogikubo |
| 7,606,444 | B1 | 10/2009 | Erol et al. |
| 7,650,286 | B1 | 1/2010 | Obeid |
| 7,702,542 | B2 | 4/2010 | Aslanian |
| 7,725,812 | B1 | 5/2010 | Balkus et al. |
| 7,797,402 | B2 | 9/2010 | Roos |
| 7,810,117 | B2 | 10/2010 | Karnalkar et al. |
| 7,865,424 | B2 | 1/2011 | Pappas et al. |
| 7,895,620 | B2 | 2/2011 | Haberman et al. |
| 7,904,490 | B2 | 3/2011 | Ogikubo |
| 7,908,287 | B1 | 3/2011 | Katragadda |
| 7,962,375 | B2 | 6/2011 | Pappas et al. |
| 7,974,443 | B2 | 7/2011 | Kipman et al. |
| 7,991,635 | B2 | 8/2011 | Hartmann |
| 7,996,292 | B2 | 8/2011 | Pappas et al. |
| 8,032,447 | B2 | 10/2011 | Pappas et al. |
| 8,046,814 | B1 | 10/2011 | Badenell |
| 8,069,411 | B2 | 11/2011 | Titemore et al. |
| 8,099,415 | B2 | 1/2012 | Luo et al. |
| 8,111,326 | B1 | 2/2012 | Talwar |
| 8,112,365 | B2 | 2/2012 | Foster |
| 8,169,548 | B2 | 5/2012 | Ryckman |
| 8,185,543 | B1 | 5/2012 | Choudhry et al. |
| 8,225,204 | B2 | 7/2012 | Cheng |
| 8,229,841 | B2 | 7/2012 | Pappas et al. |
| 8,238,718 | B2 | 8/2012 | Toyama et al. |
| 8,241,628 | B2 | 8/2012 | Diefenbach-streiber et al. |
| 8,266,068 | B1 | 9/2012 | Foss et al. |
| 8,290,958 | B2 | 10/2012 | Boone et al. |
| 8,300,785 | B2 | 10/2012 | White |
| 8,301,550 | B2 | 10/2012 | Pappas et al. |
| 8,301,790 | B2 | 10/2012 | Morrison et al. |
| 8,326,133 | B2 | 12/2012 | Lemmers |
| 8,326,853 | B2 | 12/2012 | Richard et al. |
| 8,331,457 | B2 | 12/2012 | Mizuno et al. |
| 8,331,760 | B2 | 12/2012 | Butcher |
| 8,339,500 | B2 | 12/2012 | Hattori et al. |
| 8,352,850 | B1 | 1/2013 | Creed et al. |
| 8,358,346 | B2 | 1/2013 | Hikita et al. |
| 8,387,094 | B1 | 2/2013 | Ho et al. |
| 8,505,054 | B1 | 8/2013 | Kirley |
| 8,508,572 | B2 | 8/2013 | Ryckman et al. |
| 8,543,450 | B2 | 9/2013 | Pappas et al. |
| 8,560,482 | B2 | 10/2013 | Miranda et al. |
| 8,566,698 | B1 * | 10/2013 | Zubizarreta ........... G06F 40/174 |
| | | | 715/221 |
| 8,566,880 | B2 | 10/2013 | Dunker et al. |
| 8,600,211 | B2 | 12/2013 | Nagano et al. |
| 8,611,422 | B1 | 12/2013 | Yagnik et al. |
| 8,620,771 | B2 | 12/2013 | Pappas et al. |
| 8,633,964 | B1 | 1/2014 | Zhu |
| 8,650,114 | B2 | 2/2014 | Pappas et al. |
| 8,751,231 | B1 | 6/2014 | Larsen et al. |
| 8,774,604 | B2 | 7/2014 | Torii et al. |
| 8,792,780 | B2 | 7/2014 | Hattori |
| 8,824,863 | B2 | 9/2014 | Kitamura et al. |
| 8,854,457 | B2 | 10/2014 | De Vleeschouwer et al. |
| 8,856,000 | B1 | 10/2014 | Larsen et al. |
| 8,902,282 | B1 | 12/2014 | Zhu |
| 8,909,542 | B2 | 12/2014 | Montero et al. |
| 8,913,103 | B1 | 12/2014 | Sargin et al. |
| 8,918,532 | B2 | 12/2014 | Lueth et al. |
| 8,930,260 | B2 | 1/2015 | Pappas et al. |
| 8,988,528 | B2 | 3/2015 | Hikita |
| 9,009,045 | B1 | 4/2015 | Larsen et al. |
| 9,015,746 | B2 | 4/2015 | Holmdahl et al. |
| 9,026,471 | B2 | 5/2015 | Pappas et al. |
| 9,026,472 | B2 | 5/2015 | Pappas et al. |
| 9,047,634 | B2 | 6/2015 | Pappas et al. |
| 9,064,258 | B2 | 6/2015 | Pappas et al. |
| 9,070,150 | B2 | 6/2015 | Pappas et al. |
| 9,092,813 | B2 | 7/2015 | Pappas et al. |
| 9,106,804 | B2 | 8/2015 | Roberts et al. |
| 9,111,579 | B2 | 8/2015 | Meaney et al. |
| 9,117,201 | B2 | 8/2015 | Kennell et al. |
| 9,129,640 | B2 | 9/2015 | Hamer |
| 9,135,674 | B1 | 9/2015 | Yagnik et al. |
| 9,223,781 | B2 | 12/2015 | Pearson et al. |
| 9,224,156 | B2 | 12/2015 | Moorer |
| 9,305,286 | B2 | 4/2016 | Larsen et al. |
| 9,305,287 | B2 | 4/2016 | Krishnamoorthy et al. |
| 9,355,151 | B1 | 5/2016 | Cranfill et al. |
| 9,378,486 | B2 | 6/2016 | Taylor et al. |
| 9,398,315 | B2 | 7/2016 | Oks et al. |
| 9,402,050 | B1 | 7/2016 | Recchia et al. |
| 9,437,247 | B2 | 9/2016 | Pendergast et al. |
| 9,438,934 | B1 | 9/2016 | Zhu |
| 9,443,556 | B2 | 9/2016 | Cordell et al. |
| 9,456,174 | B2 | 9/2016 | Boyle et al. |
| 9,462,301 | B2 | 10/2016 | Paško |
| 9,501,663 | B1 | 11/2016 | Hopkins et al. |
| 9,501,944 | B2 | 11/2016 | Boneta et al. |
| 9,542,452 | B1 | 1/2017 | Ross et al. |
| 9,544,380 | B2 | 1/2017 | Deng et al. |
| 9,554,160 | B2 | 1/2017 | Han et al. |
| 9,570,107 | B2 | 2/2017 | Boiman et al. |
| 9,583,144 | B2 | 2/2017 | Ricciardi |
| 9,600,723 | B1 | 3/2017 | Pantofaru et al. |
| 9,607,655 | B2 | 3/2017 | Bloch et al. |
| 9,652,745 | B2 | 5/2017 | Taylor et al. |
| 9,653,115 | B2 | 5/2017 | Bloch et al. |
| 9,666,194 | B2 | 5/2017 | Ondeck et al. |
| 9,684,435 | B2 | 6/2017 | Carr et al. |
| 9,693,019 | B1 | 6/2017 | Fluhr et al. |
| 9,696,904 | B1 | 7/2017 | Mohapatra |

(56) References Cited

U.S. PATENT DOCUMENTS

| | | |
|---|---|---|
| 9,710,790 B2 | 7/2017 | Taylor et al. |
| 9,723,223 B1 | 8/2017 | Banta et al. |
| 9,747,573 B2 | 8/2017 | Shaburov et al. |
| 9,792,955 B2 | 10/2017 | Fleischhauer et al. |
| 9,805,767 B1 | 10/2017 | Strickland |
| 9,823,809 B2 | 11/2017 | Roos |
| 9,876,963 B2 | 1/2018 | Nakamura et al. |
| 9,881,647 B2 | 1/2018 | McCauley et al. |
| 9,883,144 B2 | 1/2018 | Marlow et al. |
| 9,928,230 B1 | 3/2018 | Jain et al. |
| 9,936,185 B2 | 4/2018 | Delvaux et al. |
| 9,940,508 B2 | 4/2018 | Kaps et al. |
| 9,940,973 B2 | 4/2018 | Roberts et al. |
| 9,979,921 B2 | 5/2018 | Holmes |
| 10,008,239 B2 | 6/2018 | Eris |
| 10,019,136 B1 | 7/2018 | Ozog |
| 10,019,653 B2 | 7/2018 | Wilf et al. |
| 10,021,377 B2 | 7/2018 | Newton et al. |
| 10,108,932 B2 | 10/2018 | Sung et al. |
| 10,115,038 B2 | 10/2018 | Hazur et al. |
| 10,147,460 B2 | 12/2018 | Ullrich |
| 10,152,695 B1 | 12/2018 | Chiu et al. |
| 10,152,696 B2 | 12/2018 | Thankappan et al. |
| 10,168,866 B2 | 1/2019 | Wakeen et al. |
| 10,178,427 B2 | 1/2019 | Huang |
| 10,235,008 B2 | 3/2019 | Lee et al. |
| 10,242,345 B2 | 3/2019 | Taylor et al. |
| 10,268,736 B1 | 4/2019 | Balasia et al. |
| 10,296,873 B1 | 5/2019 | Balasia et al. |
| 10,310,361 B1 | 6/2019 | Featherstone |
| 10,318,927 B2 | 6/2019 | Champaneria |
| 10,325,243 B1 | 6/2019 | Ross et al. |
| 10,325,517 B2 | 6/2019 | Nielson et al. |
| 10,331,764 B2 | 6/2019 | Rao et al. |
| 10,346,805 B2 | 7/2019 | Taylor et al. |
| 10,346,928 B2 | 7/2019 | Li et al. |
| 10,353,720 B1 | 7/2019 | Wich-vila |
| 10,433,030 B2 | 10/2019 | Packard et al. |
| 10,438,135 B2 | 10/2019 | Larsen et al. |
| 10,445,417 B2 | 10/2019 | Dhanawat et al. |
| 10,489,439 B2 | 11/2019 | Calapodescu et al. |
| 10,607,188 B2 | 3/2020 | Kyllonen et al. |
| 10,657,498 B2 | 5/2020 | Dey et al. |
| 10,664,803 B2 | 5/2020 | Obeid |
| 10,694,097 B1 | 6/2020 | Shirakyan |
| 10,728,443 B1 | 7/2020 | Olshansky |
| 10,735,396 B2 | 8/2020 | Krstic et al. |
| 10,740,349 B2 | 8/2020 | Kohlmeier et al. |
| 10,748,118 B2 | 8/2020 | Fang |
| 10,796,217 B2 | 10/2020 | Wu |
| 10,963,841 B2 | 3/2021 | Olshansky |
| 10,997,560 B2 | 5/2021 | Chen et al. |
| 11,017,335 B1 | 5/2021 | Ponce De Leon |
| 11,023,735 B1 | 6/2021 | Olshansky |
| 11,055,667 B2 | 7/2021 | Pande |
| 11,107,040 B2 | 8/2021 | Sawarkar et al. |
| 11,115,486 B2 | 9/2021 | Jimenez Salgado et al. |
| 11,127,232 B2 | 9/2021 | Olshansky |
| 11,144,882 B1 | 10/2021 | Olshansky |
| 11,184,578 B2 | 11/2021 | Olshansky |
| 11,423,071 B1 | 8/2022 | Olshansky |
| 11,907,652 B2 | 2/2024 | Olshansky et al. |
| 2001/0001160 A1 | 5/2001 | Shoff et al. |
| 2001/0038746 A1 | 11/2001 | Hughes et al. |
| 2002/0040866 A1* | 4/2002 | Tuneld .................. G06F 40/53 |
| | | 209/548 |
| 2002/0097984 A1 | 7/2002 | Abecassis |
| 2002/0103826 A1 | 8/2002 | Kriho et al. |
| 2002/0113879 A1 | 8/2002 | Battle et al. |
| 2002/0122659 A1 | 9/2002 | McGrath et al. |
| 2002/0191071 A1 | 12/2002 | Rui et al. |
| 2003/0005429 A1 | 1/2003 | Colsey |
| 2003/0027611 A1 | 2/2003 | Recard |
| 2003/0028792 A1* | 2/2003 | Plow .................... G06Q 30/02 |
| | | 715/744 |
| 2003/0189589 A1 | 10/2003 | Leblanc et al. |
| 2003/0194211 A1 | 10/2003 | Abecassis |
| 2003/0233345 A1 | 12/2003 | Perisic et al. |
| 2004/0033061 A1 | 2/2004 | Hughes et al. |
| 2004/0122809 A1 | 6/2004 | Clark et al. |
| 2004/0186743 A1 | 9/2004 | Cordero |
| 2004/0243551 A1 | 12/2004 | Boone et al. |
| 2004/0264919 A1 | 12/2004 | Taylor et al. |
| 2005/0060175 A1 | 3/2005 | Farber et al. |
| 2005/0095569 A1 | 5/2005 | Franklin |
| 2005/0137896 A1 | 6/2005 | Pentecost et al. |
| 2005/0187765 A1 | 8/2005 | Kim et al. |
| 2005/0192973 A1* | 9/2005 | Sperling ............... G06F 16/273 |
| 2005/0198563 A1 | 9/2005 | Kristjansson |
| 2005/0232462 A1 | 10/2005 | Vallone et al. |
| 2005/0235033 A1 | 10/2005 | Doherty |
| 2005/0257148 A1* | 11/2005 | Goodman ............. G06F 40/174 |
| | | 715/246 |
| 2005/0271251 A1 | 12/2005 | Russell et al. |
| 2006/0042483 A1 | 3/2006 | Work et al. |
| 2006/0045179 A1 | 3/2006 | Mizuno et al. |
| 2006/0059434 A1 | 3/2006 | Boss et al. |
| 2006/0075337 A1 | 4/2006 | Jones et al. |
| 2006/0097987 A1* | 5/2006 | Hughes ................ G06F 3/03543 |
| | | 345/156 |
| 2006/0100919 A1 | 5/2006 | Levine |
| 2006/0107197 A1 | 5/2006 | Friend et al. |
| 2006/0116555 A1 | 6/2006 | Pavlidis et al. |
| 2006/0229896 A1 | 10/2006 | Rosen et al. |
| 2007/0088601 A1 | 4/2007 | Money et al. |
| 2007/0094199 A1 | 4/2007 | Deshpande et al. |
| 2007/0124161 A1 | 5/2007 | Mueller et al. |
| 2007/0237502 A1 | 10/2007 | Ryckman et al. |
| 2007/0245308 A1* | 10/2007 | Hill ....................... G06F 40/169 |
| | | 717/114 |
| 2007/0276858 A1* | 11/2007 | Cushman, II ......... G06F 16/215 |
| | | 707/999.102 |
| 2007/0288245 A1 | 12/2007 | Benjamin |
| 2008/0086504 A1 | 4/2008 | Sanders et al. |
| 2008/0115193 A1 | 5/2008 | Prax et al. |
| 2009/0083103 A1 | 3/2009 | Basser |
| 2009/0083670 A1 | 3/2009 | Roos |
| 2009/0087161 A1 | 4/2009 | Roberts et al. |
| 2009/0094179 A1 | 4/2009 | Jager |
| 2009/0144785 A1 | 6/2009 | Walker et al. |
| 2009/0171899 A1 | 7/2009 | Chittoor et al. |
| 2009/0192884 A1 | 7/2009 | Lo |
| 2009/0204881 A1 | 8/2009 | Murthy et al. |
| 2009/0248685 A1 | 10/2009 | Pasqualoni et al. |
| 2009/0258334 A1 | 10/2009 | Pyne |
| 2010/0086283 A1 | 4/2010 | Ramachandran et al. |
| 2010/0143329 A1 | 6/2010 | Larsen |
| 2010/0183280 A1 | 7/2010 | Beauregard et al. |
| 2010/0191561 A1 | 7/2010 | Jeng et al. |
| 2010/0199228 A1 | 8/2010 | Latta et al. |
| 2010/0217757 A1 | 8/2010 | Fujioka |
| 2010/0223109 A1 | 9/2010 | Hawn et al. |
| 2010/0306645 A1 | 12/2010 | Roulland et al. |
| 2010/0325307 A1 | 12/2010 | Roos |
| 2011/0055098 A1 | 3/2011 | Stewart |
| 2011/0055930 A1 | 3/2011 | Flake et al. |
| 2011/0060671 A1 | 3/2011 | Erbey et al. |
| 2011/0076656 A1 | 3/2011 | Scott et al. |
| 2011/0088081 A1 | 4/2011 | Folkesson et al. |
| 2011/0119230 A1 | 5/2011 | Zuber |
| 2011/0119264 A1 | 5/2011 | Hu et al. |
| 2011/0135279 A1 | 6/2011 | Leonard |
| 2011/0271173 A1* | 11/2011 | Ait-Mokhtar ......... G06F 40/174 |
| | | 715/226 |
| 2012/0036127 A1 | 2/2012 | Work et al. |
| 2012/0053996 A1 | 3/2012 | Galbavy |
| 2012/0084096 A1 | 4/2012 | Wang |
| 2012/0084649 A1 | 4/2012 | Dowdell et al. |
| 2012/0114246 A1 | 5/2012 | Weitzman |
| 2012/0130771 A1 | 5/2012 | Kannan et al. |
| 2012/0257875 A1 | 10/2012 | Sharpe et al. |
| 2012/0265699 A1* | 10/2012 | Iyer ....................... G06Q 50/184 |
| | | 705/310 |
| 2012/0271774 A1 | 10/2012 | Clegg |

(56) References Cited

U.S. PATENT DOCUMENTS

| | | |
|---|---|---|
| 2013/0007670 A1 | 1/2013 | Roos |
| 2013/0016815 A1 | 1/2013 | Odinak et al. |
| 2013/0016816 A1 | 1/2013 | Odinak et al. |
| 2013/0016823 A1 | 1/2013 | Odinak et al. |
| 2013/0024105 A1 | 1/2013 | Thomas |
| 2013/0111401 A1 | 5/2013 | Newman et al. |
| 2013/0117383 A1 | 5/2013 | Hymel |
| 2013/0121668 A1 | 5/2013 | Meaney et al. |
| 2013/0124998 A1 | 5/2013 | Pendergast et al. |
| 2013/0124999 A1 | 5/2013 | Agnoli et al. |
| 2013/0125000 A1 | 5/2013 | Fleischhauer et al. |
| 2013/0177296 A1 | 7/2013 | Geisner et al. |
| 2013/0212033 A1 | 8/2013 | Work et al. |
| 2013/0212180 A1 | 8/2013 | Work et al. |
| 2013/0216206 A1 | 8/2013 | Dubin et al. |
| 2013/0216982 A1* | 8/2013 | Bennett ............... A61B 5/4866 434/127 |
| 2013/0218688 A1 | 8/2013 | Roos |
| 2013/0222601 A1 | 8/2013 | Engstroem et al. |
| 2013/0226578 A1 | 8/2013 | Bolton et al. |
| 2013/0226674 A1 | 8/2013 | Field et al. |
| 2013/0226910 A1 | 8/2013 | Work et al. |
| 2013/0254192 A1 | 9/2013 | Work et al. |
| 2013/0259447 A1 | 10/2013 | Sathish et al. |
| 2013/0262241 A1 | 10/2013 | Nelson |
| 2013/0266925 A1 | 10/2013 | Nunamaker et al. |
| 2013/0268452 A1 | 10/2013 | MacEwen et al. |
| 2013/0283378 A1 | 10/2013 | Costigan et al. |
| 2013/0290210 A1 | 10/2013 | Cline et al. |
| 2013/0290325 A1 | 10/2013 | Work et al. |
| 2013/0290420 A1 | 10/2013 | Work et al. |
| 2013/0290448 A1 | 10/2013 | Work et al. |
| 2013/0297589 A1 | 11/2013 | Work et al. |
| 2013/0332381 A1 | 12/2013 | Clark et al. |
| 2013/0332382 A1 | 12/2013 | Lapasta et al. |
| 2014/0012586 A1 | 1/2014 | Rubin et al. |
| 2014/0032594 A1 | 1/2014 | Bayliss et al. |
| 2014/0036023 A1 | 2/2014 | Croen et al. |
| 2014/0089217 A1 | 3/2014 | McGovern et al. |
| 2014/0092254 A1 | 4/2014 | Mughal et al. |
| 2014/0123177 A1 | 5/2014 | Kim et al. |
| 2014/0125703 A1 | 5/2014 | Roveta et al. |
| 2014/0143165 A1 | 5/2014 | Posse et al. |
| 2014/0153902 A1 | 6/2014 | Pearson et al. |
| 2014/0157390 A1* | 6/2014 | Lurey ............... H04L 63/083 726/7 |
| 2014/0173407 A1 | 6/2014 | Kruglick |
| 2014/0186004 A1 | 7/2014 | Hamer |
| 2014/0191939 A1 | 7/2014 | Penn et al. |
| 2014/0192200 A1 | 7/2014 | Zagron |
| 2014/0198196 A1 | 7/2014 | Howard et al. |
| 2014/0214709 A1 | 7/2014 | Greaney |
| 2014/0236615 A1 | 8/2014 | Ragusky et al. |
| 2014/0245146 A1 | 8/2014 | Roos |
| 2014/0258288 A1 | 9/2014 | Work et al. |
| 2014/0258828 A1 | 9/2014 | Lymer et al. |
| 2014/0270706 A1 | 9/2014 | Pasko |
| 2014/0278506 A1 | 9/2014 | Rogers et al. |
| 2014/0278683 A1 | 9/2014 | Kennell et al. |
| 2014/0279634 A1 | 9/2014 | Seeker |
| 2014/0282709 A1 | 9/2014 | Hardy et al. |
| 2014/0317009 A1 | 10/2014 | Bilodeau et al. |
| 2014/0317126 A1 | 10/2014 | Work et al. |
| 2014/0325359 A1 | 10/2014 | Vehovsky et al. |
| 2014/0325373 A1 | 10/2014 | Kramer et al. |
| 2014/0327779 A1 | 11/2014 | Eronen et al. |
| 2014/0330734 A1 | 11/2014 | Sung et al. |
| 2014/0330773 A1 | 11/2014 | Brillhart et al. |
| 2014/0336942 A1 | 11/2014 | Pe'Er et al. |
| 2014/0337900 A1 | 11/2014 | Hurley |
| 2014/0356822 A1 | 12/2014 | Hoque et al. |
| 2014/0358810 A1 | 12/2014 | Hardtke et al. |
| 2014/0359439 A1 | 12/2014 | Lyren |
| 2014/0372857 A1 | 12/2014 | Otero et al. |
| 2015/0003603 A1 | 1/2015 | Odinak et al. |
| 2015/0003605 A1 | 1/2015 | Odinak et al. |
| 2015/0006422 A1 | 1/2015 | Carter et al. |
| 2015/0012453 A1 | 1/2015 | Odinak et al. |
| 2015/0039989 A1 | 2/2015 | Dhanawat et al. |
| 2015/0046357 A1 | 2/2015 | Danson et al. |
| 2015/0063775 A1 | 3/2015 | Nakamura et al. |
| 2015/0066535 A1* | 3/2015 | Dobrean ............... G16Z 99/00 705/3 |
| 2015/0067723 A1 | 3/2015 | Bloch et al. |
| 2015/0099255 A1 | 4/2015 | Aslan et al. |
| 2015/0100702 A1 | 4/2015 | Krishna et al. |
| 2015/0127565 A1 | 5/2015 | Chevalier et al. |
| 2015/0139601 A1 | 5/2015 | Mate et al. |
| 2015/0154564 A1 | 6/2015 | Moon et al. |
| 2015/0155001 A1 | 6/2015 | Kikugawa et al. |
| 2015/0170303 A1 | 6/2015 | Geritz et al. |
| 2015/0201134 A1 | 7/2015 | Carr et al. |
| 2015/0205800 A1 | 7/2015 | Work et al. |
| 2015/0205872 A1 | 7/2015 | Work et al. |
| 2015/0206102 A1 | 7/2015 | Cama et al. |
| 2015/0222815 A1 | 8/2015 | Wang et al. |
| 2015/0228306 A1 | 8/2015 | Roberts et al. |
| 2015/0242707 A1 | 8/2015 | Wilf et al. |
| 2015/0269165 A1 | 9/2015 | Work et al. |
| 2015/0269529 A1 | 9/2015 | Kyllonen et al. |
| 2015/0269530 A1 | 9/2015 | Work et al. |
| 2015/0271289 A1 | 9/2015 | Work et al. |
| 2015/0278223 A1 | 10/2015 | Work et al. |
| 2015/0278290 A1 | 10/2015 | Work et al. |
| 2015/0278964 A1 | 10/2015 | Work et al. |
| 2015/0286988 A1 | 10/2015 | Ogrinz et al. |
| 2015/0324698 A1 | 11/2015 | Karaoguz et al. |
| 2015/0339939 A1 | 11/2015 | Gustafson et al. |
| 2015/0356512 A1 | 12/2015 | Bradley |
| 2015/0380052 A1 | 12/2015 | Hamer |
| 2016/0005029 A1 | 1/2016 | Ivey et al. |
| 2016/0036976 A1 | 2/2016 | Odinak et al. |
| 2016/0062972 A1 | 3/2016 | Ramakrishnan et al. |
| 2016/0104096 A1 | 4/2016 | Ovick et al. |
| 2016/0116827 A1 | 4/2016 | Tarres Bolos |
| 2016/0117942 A1 | 4/2016 | Marino et al. |
| 2016/0139562 A1 | 5/2016 | Crowder et al. |
| 2016/0154883 A1 | 6/2016 | Boerner |
| 2016/0155475 A1 | 6/2016 | Hamer |
| 2016/0180234 A1 | 6/2016 | Siebach et al. |
| 2016/0180883 A1 | 6/2016 | Hamer |
| 2016/0219264 A1 | 7/2016 | Delvaux et al. |
| 2016/0225409 A1 | 8/2016 | Eris |
| 2016/0225410 A1 | 8/2016 | Lee et al. |
| 2016/0247537 A1 | 8/2016 | Ricciardi |
| 2016/0267436 A1 | 9/2016 | Silber et al. |
| 2016/0313892 A1 | 10/2016 | Roos |
| 2016/0323608 A1 | 11/2016 | Bloch et al. |
| 2016/0330398 A1 | 11/2016 | Recchia et al. |
| 2016/0364692 A1 | 12/2016 | Bhaskaran et al. |
| 2017/0024614 A1 | 1/2017 | Sanil et al. |
| 2017/0026667 A1 | 1/2017 | Pasko |
| 2017/0039525 A1 | 2/2017 | Seidle et al. |
| 2017/0068404 A1 | 3/2017 | Jobs et al. |
| 2017/0076751 A9 | 3/2017 | Hamer |
| 2017/0134776 A1 | 5/2017 | Ranjeet et al. |
| 2017/0148488 A1 | 5/2017 | Li et al. |
| 2017/0164013 A1 | 6/2017 | Abramov et al. |
| 2017/0164014 A1 | 6/2017 | Abramov et al. |
| 2017/0164015 A1 | 6/2017 | Abramov et al. |
| 2017/0171602 A1 | 6/2017 | Qu |
| 2017/0178688 A1 | 6/2017 | Ricciardi |
| 2017/0195491 A1 | 7/2017 | Odinak et al. |
| 2017/0206504 A1 | 7/2017 | Taylor et al. |
| 2017/0213190 A1 | 7/2017 | Hazan |
| 2017/0213573 A1 | 7/2017 | Takeshita et al. |
| 2017/0227353 A1 | 8/2017 | Brunner |
| 2017/0236073 A1 | 8/2017 | Borisyuk et al. |
| 2017/0244894 A1 | 8/2017 | Aggarwal et al. |
| 2017/0244984 A1 | 8/2017 | Aggarwal et al. |
| 2017/0244991 A1 | 8/2017 | Aggarwal et al. |
| 2017/0262706 A1 | 9/2017 | Sun et al. |
| 2017/0264958 A1 | 9/2017 | Hutten |
| 2017/0293413 A1 | 10/2017 | Matsushita et al. |

(56) References Cited

U.S. PATENT DOCUMENTS

| | | |
|---|---|---|
| 2017/0316806 A1 | 11/2017 | Warren et al. |
| 2017/0332044 A1 | 11/2017 | Marlow et al. |
| 2017/0353769 A1 | 12/2017 | Husain et al. |
| 2017/0357627 A1* | 12/2017 | Peterson ............... G06F 7/023 |
| 2017/0372748 A1 | 12/2017 | McCauley et al. |
| 2018/0011621 A1 | 1/2018 | Roos |
| 2018/0025303 A1 | 1/2018 | Janz |
| 2018/0054641 A1 | 2/2018 | Hall et al. |
| 2018/0070045 A1 | 3/2018 | Holmes |
| 2018/0074681 A1 | 3/2018 | Roos |
| 2018/0082238 A1 | 3/2018 | Shani |
| 2018/0082680 A1 | 3/2018 | Pereg et al. |
| 2018/0096307 A1 | 4/2018 | Fortier et al. |
| 2018/0109737 A1 | 4/2018 | Nakamura et al. |
| 2018/0109826 A1 | 4/2018 | McCoy et al. |
| 2018/0110460 A1 | 4/2018 | Danson et al. |
| 2018/0114154 A1 | 4/2018 | Bae |
| 2018/0130497 A1 | 5/2018 | McCauley et al. |
| 2018/0132014 A1 | 5/2018 | Khazanov et al. |
| 2018/0150604 A1 | 5/2018 | Arena et al. |
| 2018/0158027 A1 | 6/2018 | Venigalla |
| 2018/0182436 A1 | 6/2018 | Ullrich |
| 2018/0191955 A1 | 7/2018 | Aoki et al. |
| 2018/0211258 A1* | 7/2018 | Buis ............... G06Q 20/12 |
| 2018/0218238 A1 | 8/2018 | Viirre et al. |
| 2018/0226102 A1 | 8/2018 | Roberts et al. |
| 2018/0227501 A1 | 8/2018 | King |
| 2018/0232751 A1 | 8/2018 | Terhark et al. |
| 2018/0247271 A1 | 8/2018 | Van Hoang et al. |
| 2018/0253697 A1 | 9/2018 | Sung et al. |
| 2018/0260085 A1 | 9/2018 | Whitelaw et al. |
| 2018/0260086 A1 | 9/2018 | Leme et al. |
| 2018/0268868 A1 | 9/2018 | Salokannel et al. |
| 2018/0270613 A1 | 9/2018 | Park |
| 2018/0302680 A1 | 10/2018 | Cormican |
| 2018/0308521 A1 | 10/2018 | Iwamoto |
| 2018/0316947 A1 | 11/2018 | Todd |
| 2018/0336528 A1 | 11/2018 | Carpenter et al. |
| 2018/0336930 A1 | 11/2018 | Takahashi |
| 2018/0350405 A1 | 12/2018 | Marco et al. |
| 2018/0353769 A1 | 12/2018 | Smith et al. |
| 2018/0374251 A1 | 12/2018 | Mitchell et al. |
| 2018/0376225 A1 | 12/2018 | Jones et al. |
| 2019/0005373 A1 | 1/2019 | Nims et al. |
| 2019/0019157 A1 | 1/2019 | Saha et al. |
| 2019/0057356 A1 | 2/2019 | Larsen et al. |
| 2019/0087455 A1 | 3/2019 | He et al. |
| 2019/0087558 A1 | 3/2019 | Mercury et al. |
| 2019/0096307 A1 | 3/2019 | Liang et al. |
| 2019/0141033 A1 | 5/2019 | Kaafar et al. |
| 2019/0155894 A1* | 5/2019 | Gandhi ............... G06F 40/186 |
| 2019/0156292 A1* | 5/2019 | Wehrle ............... G06F 40/205 |
| 2019/0197102 A1 | 6/2019 | Lerner et al. |
| 2019/0213242 A1* | 7/2019 | Pathak ............... G06F 40/174 |
| 2019/0220824 A1 | 7/2019 | Liu |
| 2019/0244176 A1 | 8/2019 | Chuang et al. |
| 2019/0259002 A1 | 8/2019 | Balasia et al. |
| 2019/0295040 A1 | 9/2019 | Clines |
| 2019/0311488 A1 | 10/2019 | Sareen |
| 2019/0325064 A1 | 10/2019 | Mathiesen et al. |
| 2020/0012350 A1 | 1/2020 | Tay |
| 2020/0073924 A1 | 3/2020 | Sokol et al. |
| 2020/0110786 A1 | 4/2020 | Kim |
| 2020/0126545 A1 | 4/2020 | Kakkar et al. |
| 2020/0143329 A1 | 5/2020 | Gamaliel |
| 2020/0175961 A1 | 6/2020 | Thomson et al. |
| 2020/0311163 A1 | 10/2020 | Ma et al. |
| 2020/0311682 A1 | 10/2020 | Olshansky |
| 2020/0311953 A1 | 10/2020 | Olshansky |
| 2020/0396376 A1 | 12/2020 | Olshansky |
| 2021/0035047 A1 | 2/2021 | Mossoba et al. |
| 2021/0110104 A1* | 4/2021 | Leme ............... G06F 40/174 |
| 2021/0124751 A1* | 4/2021 | Jennings ............... G06F 9/547 |
| 2021/0158663 A1 | 5/2021 | Buchholz et al. |
| 2021/0174308 A1 | 6/2021 | Olshansky |
| 2021/0233262 A1 | 7/2021 | Olshansky |
| 2021/0312184 A1 | 10/2021 | Olshansky |
| 2021/0314521 A1 | 10/2021 | Olshansky |
| 2021/0342525 A1* | 11/2021 | Leme ............... G06F 3/0482 |
| 2022/0005295 A1 | 1/2022 | Olshansky |
| 2022/0019806 A1 | 1/2022 | Olshansky |
| 2022/0092548 A1 | 3/2022 | Olshansky |
| 2022/0391927 A1* | 12/2022 | Jain ............... H04L 63/1441 |
| 2023/0216982 A1 | 7/2023 | Chen et al. |
| 2023/0394230 A1 | 12/2023 | Olshansky et al. |

FOREIGN PATENT DOCUMENTS

| | | | |
|---|---|---|---|
| CA | 2206105 | 12/2000 | |
| CA | 2763634 | 12/2012 | |
| CN | 1140981 A * | 1/1997 | ............ G06K 1/121 |
| CN | 105229633 | 1/2016 | |
| CN | 109146430 | 1/2019 | |
| EP | 0513553 A2 * | 11/1992 | |
| EP | 1376584 | 1/2004 | |
| EP | 1566748 | 8/2005 | |
| EP | 1775949 | 12/2007 | |
| EP | 1954041 | 8/2008 | |
| JP | 2009258175 | 11/2009 | |
| JP | 2019016192 | 1/2019 | |
| WO | 9703366 | 1/1997 | |
| WO | 9713366 | 4/1997 | |
| WO | 9713367 | 4/1997 | |
| WO | 9828908 | 7/1998 | |
| WO | 9841978 | 9/1998 | |
| WO | 9905865 | 2/1999 | |
| WO | 0133421 | 5/2001 | |
| WO | 0117250 | 9/2002 | |
| WO | 03003725 | 1/2003 | |
| WO | 2004062563 | 7/2004 | |
| WO | 2005114377 | 12/2005 | |
| WO | 2006103578 | 10/2006 | |
| WO | 2006129496 | 12/2006 | |
| WO | 2007039994 | 4/2007 | |
| WO | 2007097218 | 8/2007 | |
| WO | 2008029803 | 3/2008 | |
| WO | 2008039407 | 4/2008 | |
| WO | 2009042858 | 4/2009 | |
| WO | 2009042900 | 4/2009 | |
| WO | 2009075190 | 6/2009 | |
| WO | 2009116955 | 9/2009 | |
| WO | 2009157446 | 12/2009 | |
| WO | 2010055624 | 5/2010 | |
| WO | 2010116998 | 10/2010 | |
| WO | 2011001180 | 1/2011 | |
| WO | 2011007011 | 1/2011 | |
| WO | 2011035419 | 3/2011 | |
| WO | 2011129578 | 10/2011 | |
| WO | 2011136571 | 11/2011 | |
| WO | 2012002896 | 1/2012 | |
| WO | 2012068433 | 5/2012 | |
| WO | 2012039959 | 6/2012 | |
| WO | 2012089855 | 7/2012 | |
| WO | 2013026095 | 2/2013 | |
| WO | 2013039351 | 3/2013 | |
| WO | 2013074207 | 5/2013 | |
| WO | 2013088208 | 6/2013 | |
| WO | 2013093176 | 6/2013 | |
| WO | 2013131134 | 9/2013 | |
| WO | 2013165923 | 11/2013 | |
| WO | 2014089362 | 6/2014 | |
| WO | 2014093668 | 6/2014 | |
| WO | 2014152021 | 9/2014 | |
| WO | 2014163283 | 10/2014 | |
| WO | 2014164549 | 10/2014 | |
| WO | 2015031946 | 4/2015 | |
| WO | 2015071490 | 5/2015 | |
| WO | 2015109290 | 7/2015 | |
| WO | 2016031431 | 3/2016 | |
| WO | 2016053522 | 4/2016 | |
| WO | 2016073206 | 5/2016 | |
| WO | 2016123057 | 8/2016 | |
| WO | 2016138121 | 9/2016 | |
| WO | 2016138161 | 9/2016 | |

(56) References Cited

FOREIGN PATENT DOCUMENTS

| | | |
|---|---|---|
| WO | 2016186798 | 11/2016 |
| WO | 2016189348 | 12/2016 |
| WO | 2017022641 | 2/2017 |
| WO | 2017042831 | 3/2017 |
| WO | 2017049612 | 3/2017 |
| WO | 2017051063 | 3/2017 |
| WO | 2017096271 | 6/2017 |
| WO | 2017130810 | 8/2017 |
| WO | 2017150772 | 9/2017 |
| WO | 2017192125 | 11/2017 |
| WO | 2018042175 | 3/2018 |
| WO | 2018094443 | 5/2018 |
| WO | 2020198230 | 10/2020 |
| WO | 2020198240 | 10/2020 |
| WO | 2020198363 | 10/2020 |
| WO | 2021108564 | 6/2021 |
| WO | 2021202293 | 10/2021 |
| WO | 2021202300 | 10/2021 |

OTHER PUBLICATIONS

"American Express Frequently Asked Question: Why were Membership Rewards points forfeited and how can I reinstate them?," https://www.americanexpress.com/us/customer-service/faq.membership-rewards-points-forfeiture.html, 2 pages.

"DaXtra Parser (CVX) Technical Specifications," DaXtra Parser Spec. available at URL: <https://cvxdemo.daxtra.com/cvx/download/Parser%20Technical%20Specifications.pdf> at least as early as Feb. 25, 2021 (3 pages).

"Final Office Action," for U.S. Appl. No. 16/366,703 mailed Nov. 19, 2019 (25 pages).

"Final Office Action," for U.S. Appl. No. 16/696,781 mailed Oct. 8, 2020 (26 pages).

"Final Office Action," for U.S. Appl. No. 16/828,578 mailed Jan. 14, 2021 (27 pages).

"Final Office Action," for U.S. Appl. No. 16/910,986 mailed Jan. 25, 2022 (40 pages).

"Final Office Action," for U.S. Appl. No. 17/500,687 mailed Jun. 6, 2022 (22 pages).

"How We Calculate Sentiment Score," AI AlphaSense Article published online at URL <https://www.alpha-sense.com/blog/sentiment-score/> on Sep. 10, 2020 (4 pages).

"International Preliminary Report on Patentability," for PCT Application No. PCT/US2020/024470 mailed Oct. 7, 2021 (9 pages).

"International Preliminary Report on Patentability," for PCT Application No. PCT/US2020/024488 mailed Oct. 7, 2021 (9 pages).

"International Preliminary Report on Patentability," for PCT Application No. PCT/US2020/024722 mailed Oct. 7, 2021 (8 pages).

"International Preliminary Report on Patentability," for PCT Application No. PCT/US2020/062246 mailed Jun. 9, 2022 (12 pages).

"International Search Report and Written Opinion," for PCT Application No. PCT/US2020/024470 mailed Jul. 9, 2020 (13 pages).

"International Search Report and Written Opinion," for PCT Application No. PCT/US2020/024488 mailed May 19, 2020 (14 pages).

"International Search Report and Written Opinion," for PCT Application No. PCT/US2020/024722 mailed Jul. 10, 2020 (13 pages).

"International Search Report and Written Opinion," for PCT Application No. PCT/US2020/062246 mailed Apr. 1, 2021 (18 pages).

"International Search Report and Written Opinion," for PCT Application No. PCT/US2021/024423 mailed Jun. 16, 2021 (13 pages).

"International Search Report and Written Opinion," for PCT Application No. PCT/US2021/024450 mailed Jun. 4, 2021 (14 pages).

"Invitation to Pay Additional Fees," for PCT Application No. PCT/US2020/062246 mailed Feb. 11, 2021 (14 pages).

"Non-Final Office Action," for U.S. Appl. No. 16/366,703 mailed Jun. 10, 2019 (28 pages).

"Non-Final Office Action," for U.S. Appl. No. 16/366,703 mailed May 6, 2020 (65 pages).

"Non-Final Office Action," for U.S. Appl. No. 16/366,746 mailed Aug. 22, 2019 (53 pages).

"Non-Final Office Action," for U.S. Appl. No. 16/696,781 mailed Apr. 7, 2020 (43 pages).

"Non-Final Office Action," for U.S. Appl. No. 16/696,781 mailed Jan. 26, 2021 (28 pages).

"Non-Final Office Action," for U.S. Appl. No. 16/828,578 mailed Sep. 24, 2020 (39 pages).

"Non-Final Office Action," for U.S. Appl. No. 16/910,986 mailed Jun. 23, 2021 (70 pages).

"Non-Final Office Action," for U.S. Appl. No. 17/025,902 mailed Jan. 29, 2021 (59 pages).

"Non-Final Office Action," for U.S. Appl. No. 17/230,692 mailed Feb. 15, 2022 (58 pages).

"Non-Final Office Action," for U.S. Appl. No. 17/396,294 mailed Jul. 7, 2022 (57 pages).

"Non-Final Office Action," for U.S. Appl. No. 17/500,687 mailed Feb. 1, 2022 (51 pages).

"Non-Final Office Action," for U.S. Appl. No. 17/831,246 mailed May 11, 2023 (62 pages).

"Notice of Allowance," for U.S. Appl. No. 16/366,703 mailed Nov. 18, 2020 (19 pages).

"Notice of Allowance," for U.S. Appl. No. 16/366,746 mailed Mar. 12, 2020 (40 pages).

"Notice of Allowance," for U.S. Appl. No. 16/696,781 mailed May 17, 2021 (20 pages).

"Notice of Allowance," for U.S. Appl. No. 16/910,986 mailed May 20, 2022 (17 pages).

"Notice of Allowance," for U.S. Appl. No. 16/931,964 mailed Feb. 2, 2021 (42 pages).

"Notice of Allowance," for U.S. Appl. No. 17/025,902 mailed May 11, 2021 (20 pages).

"Notice of Allowance," for U.S. Appl. No. 17/212,688 mailed Jun. 9, 2021 (39 pages).

"Notice of Allowance," for U.S. Appl. No. 17/463,221 mailed Apr. 18, 2022 (51 pages).

"Notice of Allowance," for U.S. Appl. No. 17/831,264 mailed Oct. 12, 2023 (13 pages).

"Nurse Resumes," Post Job Free Resume Search Results for "nurse" available at URL <https://www.postjobfree.com/resumes?q=nurse&l=&radius=25> at least as early as Jan. 26, 2021 (2 pages).

"Nurse," LiveCareer Resume Search results available online at URL <https://www.livecareer.com/resume-search/search?jt=nurse> website published as early as Dec. 21, 2017 (4 pages).

"Response to Advisory Action," for U.S. Appl. No. 16/696,781, filed on Jan. 8, 2021 (22 pages).

"Response to Final Office Action," for U.S. Appl. No. 16/366,703, filed on Feb. 18, 2020 (19 pages).

"Response to Final Office Action," for U.S. Appl. No. 16/696,781, filed on Dec. 8, 2020 (18 pages).

"Response to Final Office Action," for U.S. Appl. No. 16/910,986, filed on Apr. 20, 2022 (13 pages).

"Response to Non Final Office Action," for U.S. Appl. No. 16/366,746, filed on Nov. 21, 2019 (12 pages).

"Response to Non Final Office Action," for U.S. Appl. No. 16/696,781, filed on Apr. 23, 2021 (16 pages).

"Response to Non Final Office Action," for U.S. Appl. No. 16/696,781, filed on Jul. 6, 2020 (14 pages).

"Response to Non Final Office Action," for U.S. Appl. No. 16/828,578, filed on Dec. 22, 2020 (17 pages).

"Response to Non Final Office Action," for U.S. Appl. No. 16/910,986, filed on Sep. 30, 2021 (18 pages).

"Response to Non Final Office Action," for U.S. Appl. No. 17/025,902, filed on Apr. 28, 2021 (16 pages).

"Response to Non Final Office Action," for U.S. Appl. No. 17/230,692, filed on Jun. 14, 2022 (15 pages).

"Response to Non Final Office Action," for U.S. Appl. No. 17/500,687, filed on May 2, 2022 (17 pages).

"Response to Non Final Office Action," for U.S. Appl. No. 17/831,264, filed on Aug. 13, 2023 (15 pages).

"Response to Non-Final Rejection," mailed on May 6, 2020 for U.S. Appl. No. 16/366,703, submitted via EFS-Web on Sep. 8, 2020, 25 pages.

(56) References Cited

OTHER PUBLICATIONS

"Resume Database," Mighty Recruiter Resume Database available online at URL <https://www.mightyrecruiter.com/features/resume-database> at least as early as Sep. 4, 2017 (6 pages).
"Resume Library," Online job board available at Resume-library.com at least as early as Aug. 6, 2019 (6 pages).
"Television Studio," Wikipedia, Published Mar. 8, 2019 and retrieved May 27, 2021 from URL <https://en.wikipedia.org/w/index/php?title=Television_studio&oldid=886710983> (3 pages).
"Understanding Multi-Dimensionality in Vector Space Modeling," Pythonic Excursions article published Apr. 16, 2019, accessible at URL <https://aegis4048.github.io/understanding_multi-dimensionality_in_vector_space_modeling> (29 pages).
"What is CV/Resume Parsing?," daXtra blog post published Oct. 18, 2016 at URL <https://info.daxtra.com/blog/2016/10/18/what-is-cvresume-parsing> (5 pages).
Advantage Video Systems "Jeffrey Stansfield of AVS interviews rep about Air-Hush products at the 2019 NAMM Expo," YouTube video, available at https://www.youtube.com/watch?v=nWzrM99qk_o, accessed Jan. 17, 2021.
Alley, E. "Professional Autonomy in Video Relay Service Interpreting: Perceptions of American Sign Language—English Interpreters," (Order No. 10304259). Available from ProQuest Dissertations and Theses Professional. (Year: 2016), 209 pages.
Bishop, Todd "Microsoft patents tech to score meetings using body language, facial expressions, other data," Article published Nov. 28, 2020 at URL <https://www.geekwire.com/author/todd/> (7 pages).
Brocardo, Marcelo Luiz, et al. "Verifying Online User Identity using Stylometric Analysis for Short Messages," Journal of Networks, vol. 9, No. 12, Dec. 2014, pp. 3347-3355.
Hughes, K. "Corporate Channels: How American Business and Industry Made Television Useful," (Order No. 10186420). Available from ProQuest Dissertations and Theses Professional. (Year: 2015), 499 pages.
Jakubowski, Kelly, et al. "Extracting Coarse Body Movements from Video in Music Performance: A Comparison of Automated Computer Vision Techniques with Motion Capture Data," Front. Digit. Humanit. 2017, 4:9 (8 pages).
Johnson, Stefanie K., et al. "Research: To Reduce Gender Bias, Anonymize Job Applications," Harvard Business Review article published Mar. 5, 2020 available online at URL <https://hbr.org/2020/03/research-to-reduce-gender-bias-anonymize-job-applications> (7 pages).
Johnston, A. M, et al. "A Mediated Discourse Analysis of Immigration Gatekeeping Interviews," (Order No. 3093235). Available from ProQuest Dissertations and Theses Professional (Year: 2003), 262 pages.
Krause, Annabelle, et al. "Anonymous job applications in Europe," IZA Jounal of European Labor Studies 2012, 1:5 (20 pages).
Lai, Kenneth, et al. "Decision Support for Video-based Detection of Flu Symptoms," Biometric Technologies Laboratory, Department of Electrical and Computer Engineering, University of Calgary, Canada, Aug. 24, 2020 available at URL <https://ucalgary.ca/labs/biometric-technologies/publications> (8 pages).
Liu, Weihua, et al. "RGBD Video Based Human Hand Trajectory Tracking and Gesture Recognition System," Mathematical Problems in Engineering vol. 2015, article ID 863732 (16 pages).
Luenendonk, Martin "The Secrets to Interviewing for a Role That's Slightly Out of Reach," Cleverism Article available at URL <https://www.cleverism.com/interviewing-for-a-role-thats-slightly-out-of-reach/> last updated Sep. 25, 2019 (13 pages).
Pentland, S. J. "Human-Analytics in Information Systems Research and Applications in Personnel Selection," (Order No. 10829600). Available from ProQuest Dissertations and Theses Professional. (Year: 2018), 158 pages.
Ramanarayanan, Vikram, et al. "Evaluating Speech, Face, Emotion and Body Movement Time-series Features for Automated Multimodal Presentation Scoring," In Proceedings of the 2015 ACM on (ICMI 2015). Association for Computing Machinery, New York, NY, USA, 23-30 (8 pages).
Randhavane, Tanmay, et al. "Identifying Emotions from Walking Using Affective and Deep Features," Jan. 9, 2020 Article available at Cornell University website URL <https://arxiv.org/abs/1906.11884v4> (15 pages).
Swanepoel, De Wet, et al. "A Systematic Review of Telehealth Applications in Audiology," Telemedicine and e-Health 16.2 (2010): 181-200 (20 pages).
Wang, Jenny "How to Build a Resume Recommender like the Applicant Tracking System (ATS)," Towards Data Science article published Jun. 25, 2020, accessible at URL <https://towardsdatascience.com/resume-screening-tool-resume-recommendation-engine-in-a-nutshell-53fcf6e6559b> (14 pages).
Yun, Jaeseok, et al. "Human Movement Detection and Identification Using Pyroelectric Infrared Sensors," Sensors 2014, 14, 8057-8081 (25 pages).

* cited by examiner

Document Creator

132 → Master Group: ☐

104 — Manager Name: Tom Smith ☐ 742
Phone Number: 555-123-4567 ☐
Email Adress: Tom.smith@email.com ☐
☐ 744

134 → ◄●┤┤► 140 ▦
    136   138

Job Title: Registered Nurse ☐
Job Type: Permanent ☐
Schedule: Full Time ☐
☐
◄●┤┤► ▦

Qualification #1: Licensed as Registered Nurse ☐
Qualification #2: Experience with electronic MRS ☐
Qualification #3: Prior experience in a SNF ☐
☐
◄●┤┤► ▦

FIG. 19

Document Creator

132 → Master Group: ☐

Manager Name: Beth Li

Phone Number: 555-987-6543

Email Adress: Beth.li@email.com

Job Title: Registered Nurse

Job Type: Temporary

Schedule: Part Time

Qualification #1: Licensed as Registered Nurse

Qualification #2: Experience with electronic MRS

Qualification #3: Prior experience in a SNF

FIG. 20

Document Creator

132 → Master Group: ☐

- 104 — Manager Name: Beth Li
- Phone Number: 555-987-6543
- Email Adress: Beth.li@email.com

134 — 136 — 138 — 140

- Job Title: Licensed Practical Nurse
- Job Type: Permanent
- Schedule: Part Time

- Qualification #1: Licensed as Practical Nurse
- Qualification #2: Experience with electronic MRS
- Qualification #3: Prior experience in a SNF

FIG. 21

Document Creator

Manager Name:
  Beth Li

Phone Number:
  555-987-6543

Email Adress:
  Beth.li@email.com

Job Title:
  Licensed Practical Nurse

Job Type:
  Permanent

Schedule:
  Part Time

Job Description (Qualification, Requirements, and Benefits):

> The ....
>
>   Licensed as Practical Nurse
>
>     Experience with electronic MRS
>
>   Prior experience in a SNF

[ Edit Document ]  [ Create Document ]

FIG. 22

Document Creator

Employer:
  ABC Medical

Location:
  Rochester, MN

Job Posting ID#:
  12-34-5678

Job Title:
  Licensed Practical Nurse

Job Type:
  Permanent

Schedule:
  Part Time

Job Description (Qualification, Requirements, and Benefits):

> The ....
>
>   Licensed as Practical Nurse
>
>     Experience with electronic MRS
>
> Prior experience in a SNF...

[Respond to Post]

| | Group 1 | | | Group 2 | | | Group 3 | |
|---|---|---|---|---|---|---|---|---|
| | Job Category | Job Title | Job Description | Location | Hiring Manager | Address | Job Skill 1 | Job Skill 2 |
| 2446 | Nurse | Entry Nurse | Care for Patients | Minnesota | Joan | 100 Main Street | Prompt | Courteous |
| 2448 | Nurse | Lead Nurse | Manage Nurses | Minnesota | Joan | 100 Main Street | Responsible | Leadership |
| 2450 | Custodian | Entry Custodian | Basic Janitorial | Wisconsin | Lisa | 2 First Street | Clean | Fun |
| 2452 | Nurse | Entry Nurse | Care for Patients | Minnesota | Bill | 100 Main Street | Prompt | Courteous |
| 2454 | Custodian | Lead Custodian | Manage Custodians | Wisconsin | Lisa | 2 First Street | Responsible | Run Disposal |
| 2456 | Custodian | Entry Custodian | Basic Janitorial | Minnesota | Lisa | 100 Main Street | Clean | Vacuum |
| 2458 | Custodian | Entry Custodian | Basic Janitorial | Illinois | Lisa | 7 Second Ave | Vacuum | Dust |

FIG. 25

| Group 1 | | | Group 2 | | | Group 3 | |
|---|---|---|---|---|---|---|---|
| Job Category | Job Title | Job Description | Location | Hiring Manager | Address | Job Skill 1 | Job Skill 2 |
| Nurse | Entry Nurse | Care for Patients | Minnesota | Joan | 100 Main Street | Responsible | Leadership |
| Nurse | Lead Nurse | Manage Nurses | Wisconsin | Lisa | 2 First Street | Clean | Fun |
| Custodian | Lead Custodian | Manage Custodians | Minnesota | Bill | 100 Main Street | Prompt | Courteous |
| Custodian | Entry Custodian | Basic Janitorial | Minnesota | Lisa | 100 Main Street | Responsible | Run Disposal |
| | | | Illinois | Lisa | 7 Second Ave | Vacuum | Dust |

FIG. 26

| Group 1 | | | Group 2 | | | Group 3 | |
| --- | --- | --- | --- | --- | --- | --- | --- |
| Job Category | Job Title | Job Description | Location | Hiring Manager | Address | Job Skill 1 | Job Skill 2 |
| Custodian | Entry Custodian | Basic Janitorial | Wisconsin | Lisa | 2 First Street | Clean | Fun |
| | | | Minnesota | Lisa | 100 Main Street | Clean | Vacuum |
| | | | Illinois | Lisa | 7 Second Ave | Vacuum | Dust |

FIG. 27

| Group 1 | | | Group 2 | | | Group 3 | |
| --- | --- | --- | --- | --- | --- | --- | --- |
| Job Category | Job Title | Job Description | Location | Hiring Manager | Address | Job Skill 1 | Job Skill 2 |
| Custodian | Entry Custodian | Basic Janitorial | Minnesota | Joan | 100 Main Street | Clean | Fun |
| | | | Wisconsin | Lisa | 2 First Street | Clean | Vacuum |
| | | | Minnesota | Bill | 100 Main Street | Vacuum | Dust |
| | | | Minnesota | Lisa | 100 Main Street | | |
| | | | Illinois | Lisa | 7 Second Ave | | |

USER INTERFACE AND SYSTEMS FOR DOCUMENT CREATION

REFERENCE TO RELATED APPLICATIONS

This application is a Continuation of U.S. patent application Ser. No. 17/831,264, filed Jun. 2, 2022, the content of which is herein incorporated by reference in its entirety.

FIELD OF THE INVENTION

Embodiments herein relate to user interfaces, systems, and methods for creating a document based on previous document creation data.

SUMMARY OF THE INVENTION

Various embodiments provide a method for document creation based on previous document creations. The method can include presenting a frame to a user, i. wherein the frame includes a first field, a second field, a third field, and a fourth field, ii. wherein a first group includes the first field and the second field, iii. wherein a second group includes the third field and the fourth field. The method can include presenting a first portion of a first collection of data, i. wherein the first collection of data includes data that was previously entered into the fields of the frame, ii. wherein the first portion of the first collection of data aligns with the first group and the first portion includes a first field data entry displayed in the first field and a second field data entry displayed in the second field. The method can include receiving a confirmation or a denial of the first portion of the first collection for the first group from the user. The method can include upon receiving a denial, presenting a first portion of a second collection of data for the first group, i. wherein the second collection of data includes data that was previously entered into the fields of the frame, ii. wherein the first portion of the second collection of data aligns with the first group and the first portion includes a first field data entry displayed in the first field and a second field data entry displayed in the second field. The method can include, after receiving a denial of the first portion of the first collection, receiving a confirmation of the second collection for the first group from the user. The method can include presenting a second portion of the first collection of data, i. wherein the second portion of the first collection of data aligns with the second group and the second portion includes a third field data entry displayed in the third field and a fourth field data entry displayed in the fourth field. The method can include receiving a confirmation or a denial of the second portion of the first collection for the second group from the user. The method can include upon receiving a denial, presenting a second portion of the second collection of data for the second group, i. wherein the second portion from the second collection of data aligns with the second group and the second portion includes a third field data entry displayed in the third field and a fourth field data entry displayed in the fourth field. The method can include after receiving a denial of the second portion of the first collection, receiving a confirmation of the second portion of the second collection for the second group from the user. The method can include compiling confirmed portions of data into a prose output, and presenting the prose output to the user through a user interface.

In various embodiments, the method can further include receiving edits to the prose output from the user.

In various embodiments, the method can further include saving confirmed portions of data as a third collection.

In various embodiments, the method can further include receiving a request to present the first portion of the first collection for the first group after previously receiving a denial of the first portion of the first collection for the first group.

In various embodiments, the method can further include presenting the first portion of the first collection after receiving the request to present the first portion of the first collection for the first group.

In various embodiments, the data for the first collection was previously entered at a different time than the data for the second collection.

In various embodiments, receiving a confirmation or a denial of the first portion of the first collection for the first group from the user includes receiving a confirmation of the first field of the first portion of the first collection and a denial of the second field of the first portion of the first collection.

In various embodiments, the method can further include presenting the second field data entry of the first portion of the second collection in the second field.

In various embodiments, the method can further include receiving a confirmation of the second field of the first portion of the second collection.

In various embodiments, presenting a first portion of a first collection of data includes presenting time data associated with the first collection of data, wherein the time data is associated with when the first collection of data was created.

In various embodiments, the method can further include, upon receiving a confirmation of the first portion of the first collection of data, removing the second portion of the second collection of data from consideration.

In various embodiments, the method can further include recording a non-presentation indicator on a fourth collection in response to receiving the confirmation of the first portion of the first collection for the first group.

In various embodiments, the method can further include recording a non-presentation indicator on a fourth collection in response to receiving the confirmation of the first portion of the first collection for the first group.

Various embodiments provide a method for data entry. The method can include presenting a frame to a user, i. wherein the frame includes a first field, a second field, a third field, and a fourth field, ii. wherein a first group of fields includes the first field and the second field, iii. wherein a second group of fields includes the third field and the fourth field. The method can include retrieving a first portion of a first collection of data from a collection database, wherein the collection database includes a plurality of collections of data, each collection of data is divided into portions, each collection of data includes entries that were previously entered in completing the frame. The method can include presenting the first portion of the first collection of data, i. wherein the first portion of the first collection of data aligns with the first group and the first portion includes a first field data entry displayed in the first field and a second field data entry displayed in the second field. The method can include receiving a confirmation of the first field data entry of the first portion of the first collection for the first field of the first group from the user. The method can include in response to receiving confirmation of the first field data entry, recording a non-presentation indicator on a second collection from the collection database that inhibits the presentation of any of a first portion of the second collection of data, and presenting a second field data entry of a first portion of a third collection of data.

In various embodiments, the method can further include presenting a second portion of the first collection, i. wherein the second portion of the first collection of data aligns with the second group and the second portion includes a third field data entry display in the third field and a fourth field data entry display in the fourth field, receiving a confirmation or a denial of the second portion of the first collection for the second group from the user, upon receiving a denial, presenting a second portion of the third collection of data, i. wherein the second portion from the third collection of data aligns with the second group and the second portion includes a third field data entry displayed in the third field and a fourth field data entry displayed in the fourth field, after receiving a denial of the second portion of the first collection, receiving a confirmation of the second portion of the third collection for the second group from the user, compiling confirmed portions of data into a prose output, and presenting the prose output to the user through a user interface.

In various embodiment, the method can include presenting a second portion of the first collection, i. wherein the second portion of the first collection of data aligns with the second group and the second portion includes a third field data entry display in the third field and a fourth field data entry display in the fourth field, receiving a confirmation or a denial of the second portion of the first collection for the second group from the user, upon receiving a denial, presenting a second portion of the second collection of data, a. wherein the second portion from the second collection of data aligns with the second group and the second portion includes a third field data entry displayed in the third field and a fourth field data entry displayed in the fourth field, after receiving a denial of the second portion of the first collection, receiving a confirmation of the second portion of the second collection for the second group from the user, compiling confirmed portions of data into a prose output, and presenting the prose output to the user through a user interface.

Various embodiments provide a method for presenting an improved user interface for data entry based on prior entries. The method can include identifying a frame can include a plurality of data fields, wherein: i. the data fields in the frame are grouped into a first data group and a second data group, ii. the first group includes a first plurality of data fields, and iii. the second group includes a second plurality of data fields. The method can include receiving a plurality of data collections for the frame, wherein each data collection includes: i. a first portion of data entries for the first group, ii. a second portion of data entries for the second group. The method can include identifying a unique set of the first portions of the data entries, wherein: i. each first portion relates to a single data collection, ii. identical first portions from different data collections are scrubbed from the unique set of the first portions to remove duplicates so that the unique set of the first portions includes the first portions of a first subset of all the plurality of data collections. The method can include identifying a first unique set of the second portions of the data entries, wherein: i. each second portion relates to a single data collection, ii. identical second portions from different data collections are scrubbed from the first unique set of the second portions to remove duplicates so that the first unique set of the second portions includes the second portions of a second subset of all the plurality of data collections that is different than the first subset of all the plurality of data collections. The method can include presenting the frame for data input in the improved user interface to a user, the improved user interface is included, the method i. the first group of the frame having a first interface element to select from among the unique set of first portions of the data entries, and ii. the second group of the frame having a second interface element to select from among the first unique set of second portions of the data entries.

In various embodiments, the selection of a particular value in a particular field in the first group presented in the improved user interface causes the creation of a second unique set of the second portions, wherein only second portions from data collections having the particular value in the particular field are included in the second unique set of second portions, further wherein the second unique set of second portions are scrubbed to remove duplicates, still further wherein the second interface elements then selects from second unique set of second portions of the data entries.

In various embodiments, the unique set of first portions of the data entries is sorted in a first sort order, and is presented in the improved user interface in the first sorted order.

In various embodiments, the unique set of second portions of the data entries is sorted in a second sort order that differs from the first sort order, and is presented in the improved user interface in the second sort order.

This summary is an overview of some of the teachings of the present application and is not intended to be an exclusive or exhaustive treatment of the present subject matter. Further details are found in the detailed description and appended claims. Other aspects will be apparent to persons skilled in the art upon reading and understanding the following detailed description and viewing the drawings that form a part thereof, each of which is not to be taken in a limiting sense. The scope herein is defined by the appended claims and their legal equivalents.

BRIEF DESCRIPTION OF THE FIGURES

Aspects may be more completely understood in connection with the following figures (FIGS.), in which:

FIG. 19 is a schematic view of document creation system with a collection of data in accordance with various embodiments herein.

FIG. 20 is a schematic view of document creation system with a collection of data in accordance with various embodiments herein.

FIG. 21 is a schematic view of document creation system with a combination of data in accordance with various embodiments herein.

FIG. 22 is a schematic view of a portion of a document creation system requesting user input in accordance with various embodiments herein.

FIG. 23 is a schematic view of a document created by the document creation system in accordance with various embodiments herein.

FIG. 24 is a schematic view of various collections in accordance with various embodiments herein.

FIG. 25 is a schematic view of filtered data in accordance with various embodiments herein.

FIG. 26 is a schematic view of filtered data in accordance with various embodiments herein.

FIG. 27 is a schematic view of filtered data in accordance with various embodiments herein.

While embodiments are susceptible to various modifications and alternative forms, specifics thereof have been shown by way of example and drawings, and will be described in detail. It should be understood, however, that the scope herein is not limited to the particular aspects described. On the contrary, the intention is to cover modifications, equivalents, and alternatives falling within the spirit and scope herein.

DETAILED DESCRIPTION

Creating documents can be time consuming, repetitive, and frustrating for users. This can be especially true when the user has previously created similar documents. The interfaces, systems, and methods described herein can provide more efficient processes to create new documents based on previous inputs to create similar documents. When a user has previously created a document similar to a new document that he/she is creating, it can be helpful to make use of the previous inputs and data such that a user does not have to recreate existing data.

In some situations, documents can be automatically created or generated after a user has entered information into a frame or template. Various embodiments disclosed herein can make use of previously entered data to efficiently create a new document. Therefore, the user does not need to start from scratch. While filling out a frame of prompts requesting data from a user, a user can be presented with data that has previously been entered into the frame during a previous document creation process.

The user interfaces, systems, and methods described herein can present previously entered data to a user. The interfaces, systems, and methods allow a user to combine portions of data from different data sets or collections to create a new document. The data from a previous data set can be separated into various groups, such that a user can be shown a group of data from different data sets. The user is able to select or choose a group of data or a subset of a group (e.g., a single field of data within a group). The user's selections can be combined into a new collection of data for creating a new document. The available data sets yet to be presented to the user can be reduced based on selections made by a user. As a result, the available options shown to the user can be reduced, which can result in increased efficiency in creating the document.

Figure 1:
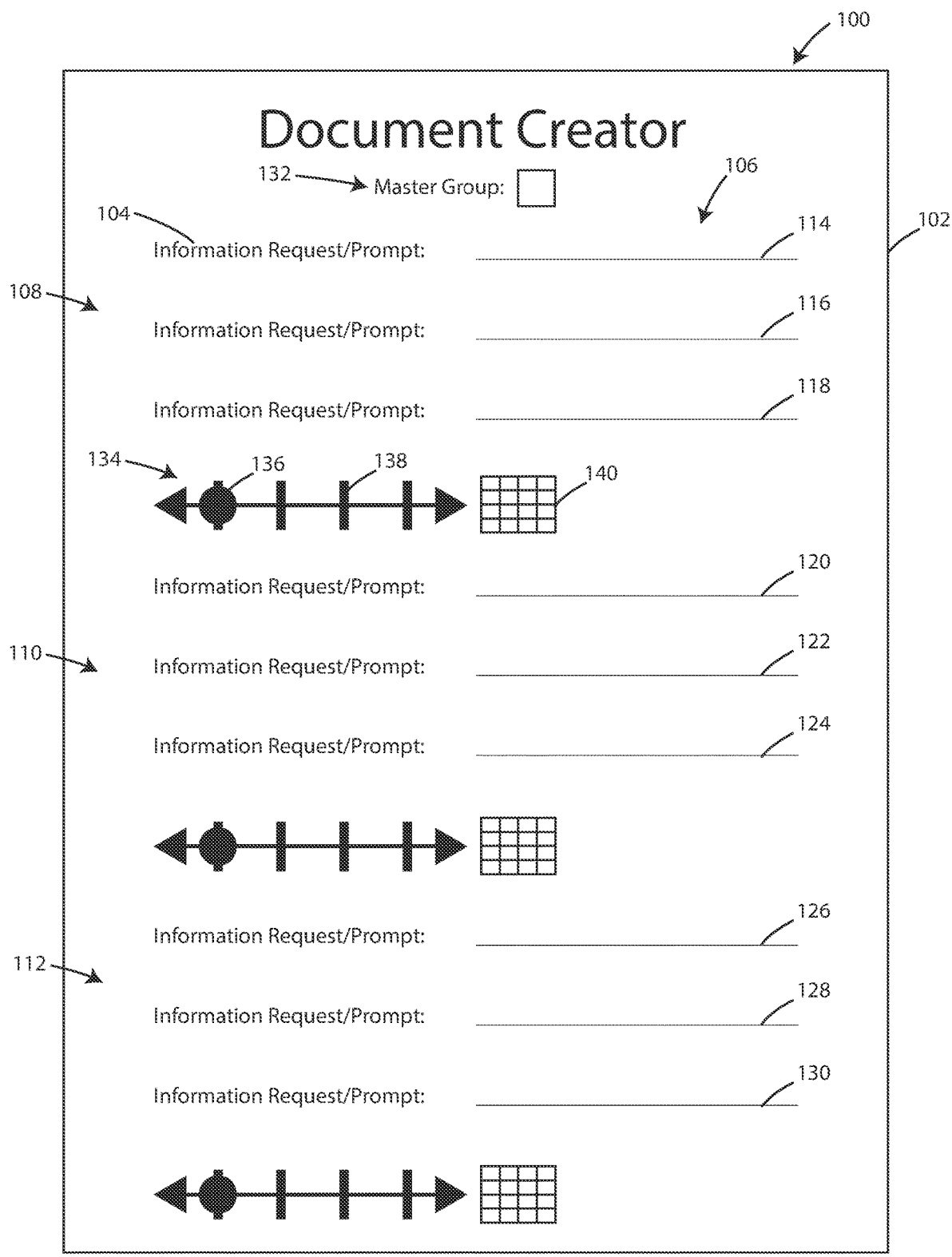
FIG. 1 is a schematic view of document creation system in accordance with various embodiments herein.

In reference now to the figures, FIG. 1 shows a schematic view of a document creation system in accordance with various embodiments herein. The subject matter shown in FIG. 1 can represent a user interface 100. The user interface 100 can display a frame 102. The frame 102 can be an outline or template that can be used for the system to display existing data to the user. The frame 102 can be used to obtain the necessary data to create the desired document through user inputs, such as confirmation or denial of presented data.

The frame 102 can include various prompts 104. The prompts 104 can be requests of specific types of data, which can vary depending on the type of document that is being created.

Each prompt 104 can be accompanied with a data field 106. The user can enter data into each of the data fields 106 in response to each or the prompts 104, such as if previous data does not appropriately respond to the prompt. In various embodiments, as will be discussed below, the data fields 106 can be populated with data from previous document creations. The system can receive a user input, such as in the form of a confirmation/acceptance or a denial/rejection of the displayed data.

The prompts 104 and the associated data fields 106 can be separated into groups. As an example, FIG. 1 show shows a first group 108, a second group 110, and a third group 112. In some embodiments, data fields 106 can be divided into at least two groups, at least three groups, at least four groups, at least five groups, at least six groups, at least seven groups, at least eight groups, at least nine groups, or at least ten groups. Additional numbers of groups are also possible.

In the embodiments shown in FIG. 1, each of the group 108, 110, 112 includes three data fields. The first group 108 includes a first field 114, a second field 116, and a third field 118. The second group 110 includes a fourth field 120, a fifth field 122, and a sixth field 124. The third group 112 includes a seventh field 126, an eighth field 128, and a ninth field 130.

In some embodiments, each group can include the same number of data fields. In some embodiments, different groups can include different numbers of data fields. In various embodiments, each group can include at least two data fields, at least three data fields, at least four data fields, at least five data fields, at least six data fields, at least seven data fields, at least eight data fields, at least nine data fields, or at least ten data fields. Additional numbers of fields within a group are also possible.

In various embodiments, the user interface can display a selector 134 for each group. The selector 134 can allow the user to switch between collections of data that are shown in the fields 106 within a group. The user can select an arrow to move the selector icon 136 between different collection icons 138. Each of the collection icons 138 can represent a previously entered collection of data that is available to the user for populating the fields within the group. In various embodiments, the collection icons 138 can each represent a collection and the collections can be arranged in chronological order in the selector 134. Other orders are possible, such as alphabetical order for one of the fields 106 in the group 108, 110, 112. As a user selects the arrows in the group selector 134, the selector icon 136 can proceed through the collection icons 138. A user can go forward or backwards through the collections using the arrows of the selector 134.

Each group can also include date selection element 140 or a calendar icon. The date selection element 140 can be selected by the user to display a calendar showing the dates of when collections of data that are available were created. As an example, a user might remember that they created a relevant collection of data on a specific date. The date selection element 140 can allow the user to jump directly to the desired collection of data based on the date. In contrast, use of the group selector arrows can switch between collections sequentially. The date selection element 140 can provide time and/or date data associated with the collections of data, such as when each collection of data was created. In some embodiments, selecting a date with the date selection element 140 returns only that subset of the collections of data that were created on that date.

Figure 2:
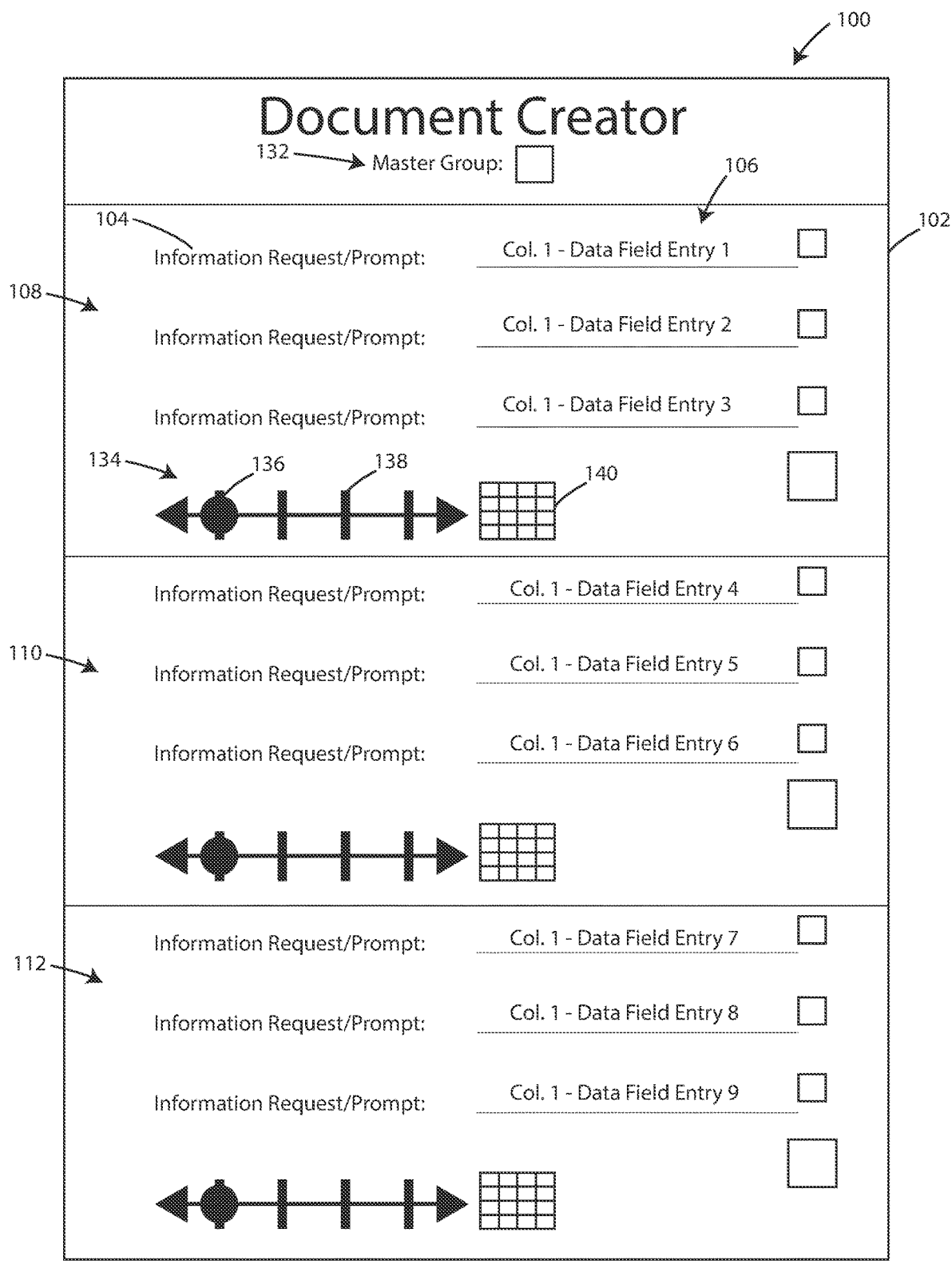
FIG. 2 is a schematic view of document creation system with a collection of data in accordance with various embodiments herein.

FIG. 2 shows a schematic view of document creation system 100 with a collection of data in accordance with various embodiments herein. In various embodiments, the frame 102 can be populated with a first collection of data, such as shown in FIG. 2. A collection of data can refer to a collection of previously entered data that completed, responded to, or filled in the data fields of a frame. A combination of data entries that were previously used to complete the frame can be saved as a collection. As an example, FIG. 2 shows a first collection, or "Col. 1." Collection 1 includes data entries for the nine fields within the frame. The format of the data within a collection can be maintained, such that each collection can include portions of data that aligns with the prompts the data responds to. The format of the data field entry data can be saved with data that related to the prompt it is associated with or responds to. As an example, the first collection can include a first data field entry that aligns with and is displayed in the first field. The first collection can include a second data field entry that aligns with and is displayed in the second field. The first collection can include data field entries that align with and are displayed in each of the fields.

The prompts can be specific depending on the type of document being created. In some embodiments, different types of documents can have different frames that can include at least some of the same prompts. Frames can also include prompts that can be specific to the type of document being generated. The frame can also include generic prompts that can be universally used between different frames, such as the name of the user creating the document or prompt requesting the title of the document being created.

Figure 3:
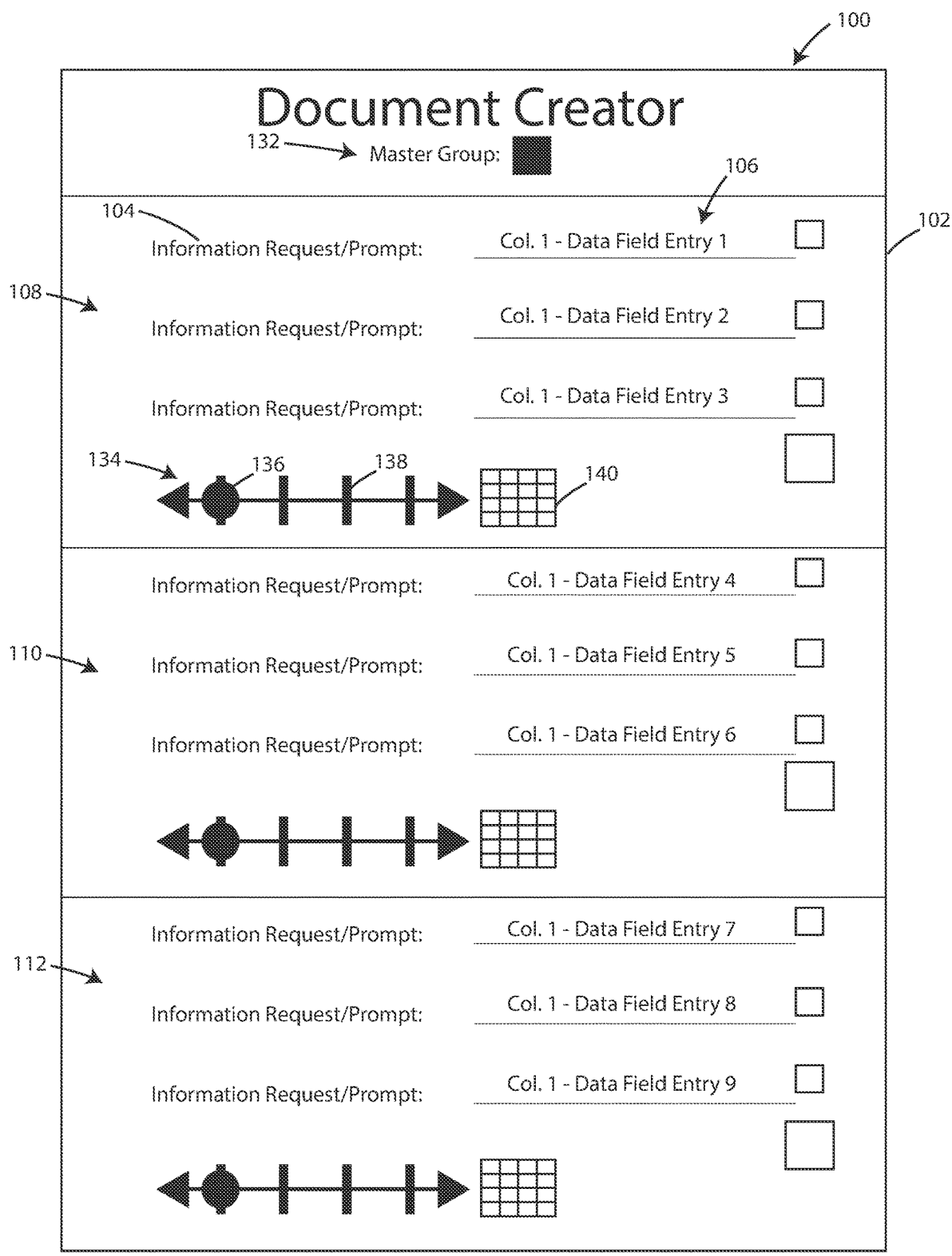
FIG. 3 is a schematic view of document creation system with a collection of data in accordance with various embodiments herein.
Figure 4:
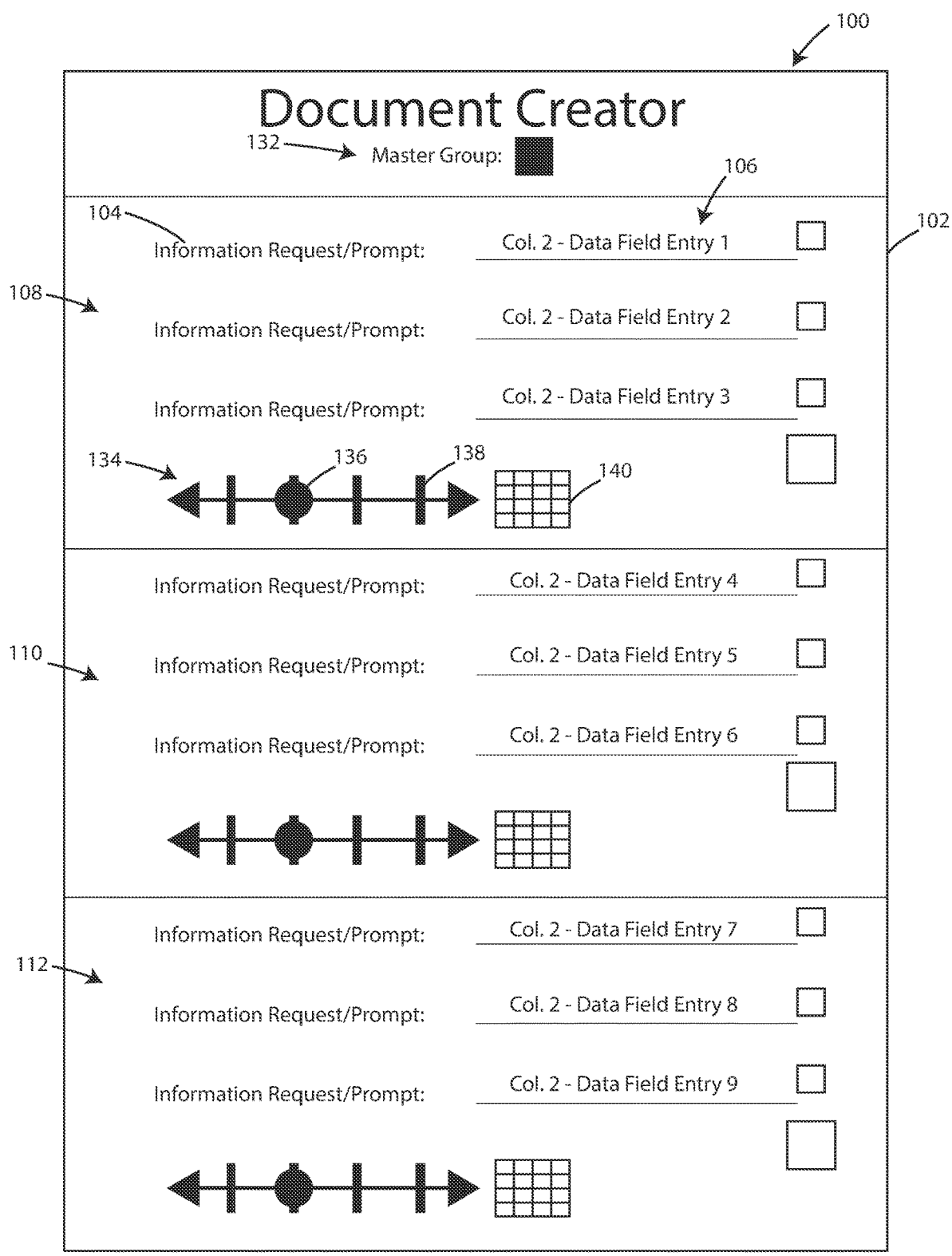
FIG. 4 is a schematic view of document creation system with a collection of data in accordance with various embodiments herein.
Figure 5:
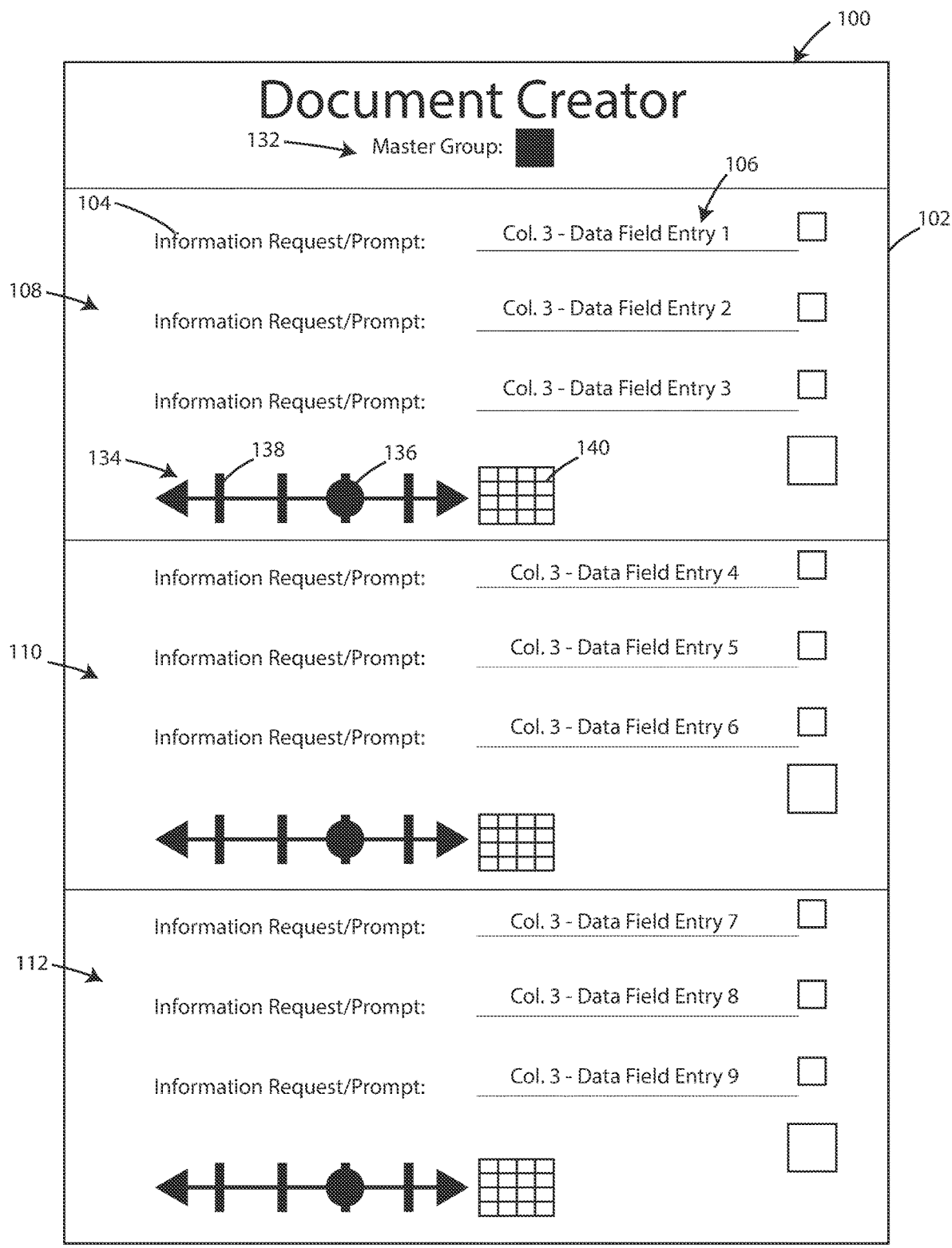
FIG. 5 is a schematic view of document creation system with a collection of data in accordance with various embodiments herein.

FIGS. 3-5 show a master grouping option provided in the interface 100. Various embodiments of the system or user interface 100 can include a master grouping selection 132. The master grouping selection 132, upon being selected, can require the system or user interface 100 to display collections in their entirety.

When a user wants to view a different collection, all of the fields of the different collection are displayed. The master grouping selection 132 when activated prevents data from different collections from being presented and/or selected together in a new combination of data. When the master grouping selection 132 is activated, the user is restricted to switching between complete collections and, if desired, selecting a complete collection for creating a document.

As an example, FIG. 3 shows the master grouping selection 132 turned ON or as selected. FIG. 3 shows the frame 102 completed with collection 1, similar to FIG. 2. The group selectors also show the selector icons on the same collection icons representing collection 1. If a user, in response to example of FIG. 3, wishes to display a different collection, he/she can switch to a different collection, such as by using the arrows on the group selector 134. Advancing to a different collection of data can be referred to as declining or a denial of the first collection of data. A user can go back or return to a previously shown collection of data by selecting an arrow in the opposite direction.

Upon advancing the selector icon 136 to the next collection icon 138, the next collection of data can be populated into the fields and presented to the user. FIG. 4 shows the frame populated with a second collection or collection 2 in response to receiving a denial from the user in response to collection 1 shown in FIG. 3. Similarly, FIG. 5 shows the frame populated with a third collection or collection 3 in response to receiving a denial from the user in response to collection 2 shown in FIG. 4.

FIG. 4 shows the selector icon 136 advanced to the second collection icon 138. FIG. 5 shows the selector icon advanced to the third collection icon 138. As the user switches between different collections of data, the selector icon 136 can switch between the collection icons 138 to visually provide the user information about which collection is being shown. In various embodiments, the collections and the collection icons can be ordered chronologically according to the creation dates and times of the collections. In some embodiments, when the master grouping selection 132 is on, only a single group selector 134 is displayed and active, such as that shown with the first group 108. In these embodiments, the selectors for the second group 110 and the third group 112 are not functional, so they can be greyed-out or removed from the interface 100.

Figure 6:
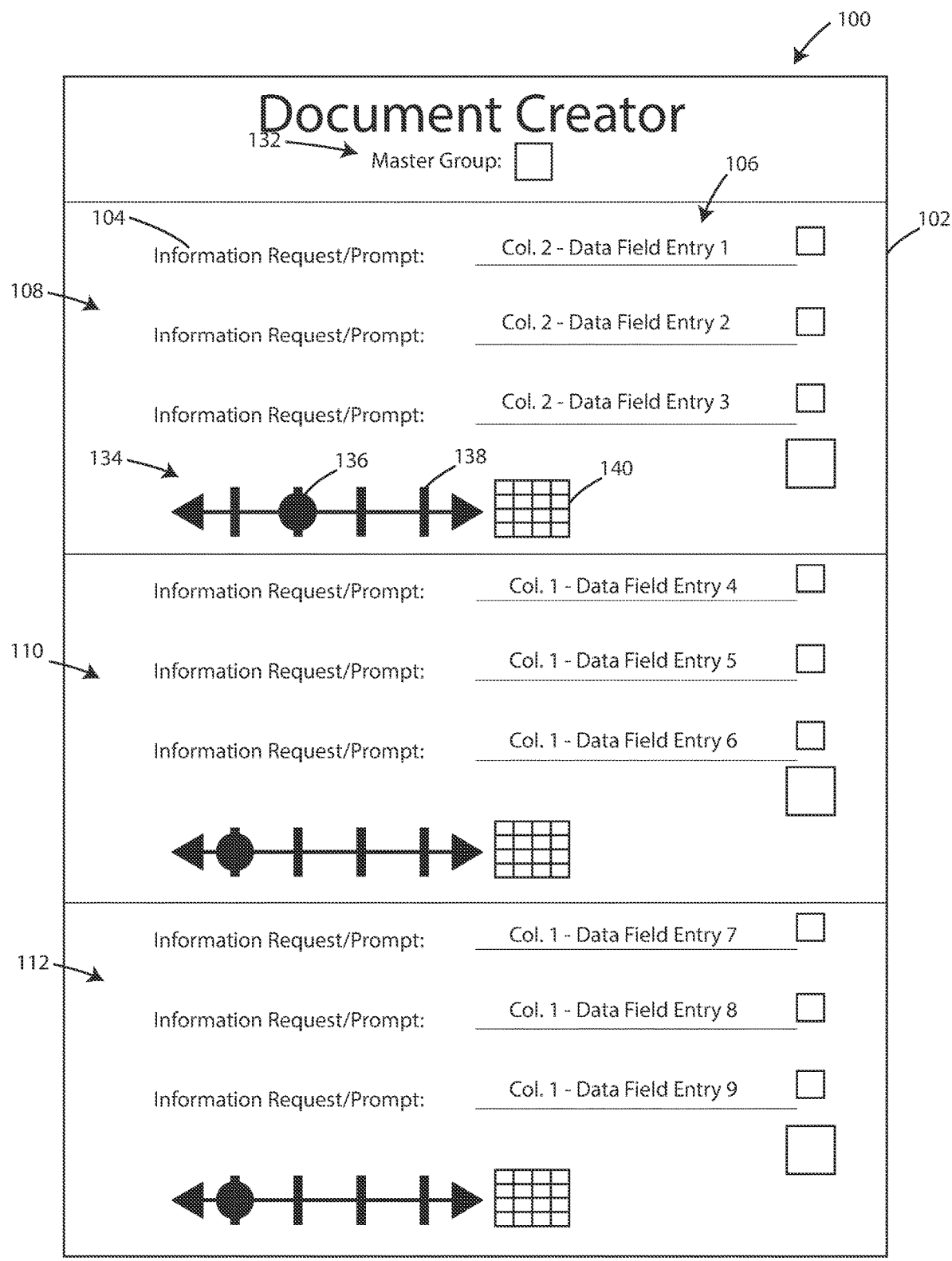
FIG. 6 is a schematic view of document creation system with a combination of data in accordance with various embodiments herein.

FIGS. 6-12 show the system combining groups of data from different collections to complete the frame 102. FIG. 2 can represent a starting point for filling out or completing the frame 102. FIG. 2 shows a first collection or collection 1 completing the frame. In various embodiments, a user may wish to include some data from collection 1 and some data from collection 2 or a different collection. As shown in FIG. 6, in response to the display of FIG. 2, a user has declined the data from collection 1 for the first group 108. The fields 114, 116, 118 of the first group 108 are now populated with the data for the first group 108 from collection 2. When the master group selection 132 is not activated, data in the frame can be presented on a group-by-group basis. The group selector 134 further shows the selector icon 136 advanced to the second collection icon 138 to represent collection 2 being presented and displayed in the first group 108.

The second group 110 and the third group 112 are still populated with the data from collection 1, as the user has not advanced the selector icons for those groups 110, 112 to a different collection for those groups, and the master grouping selection 132 is not activated/selected.

Figure 7:
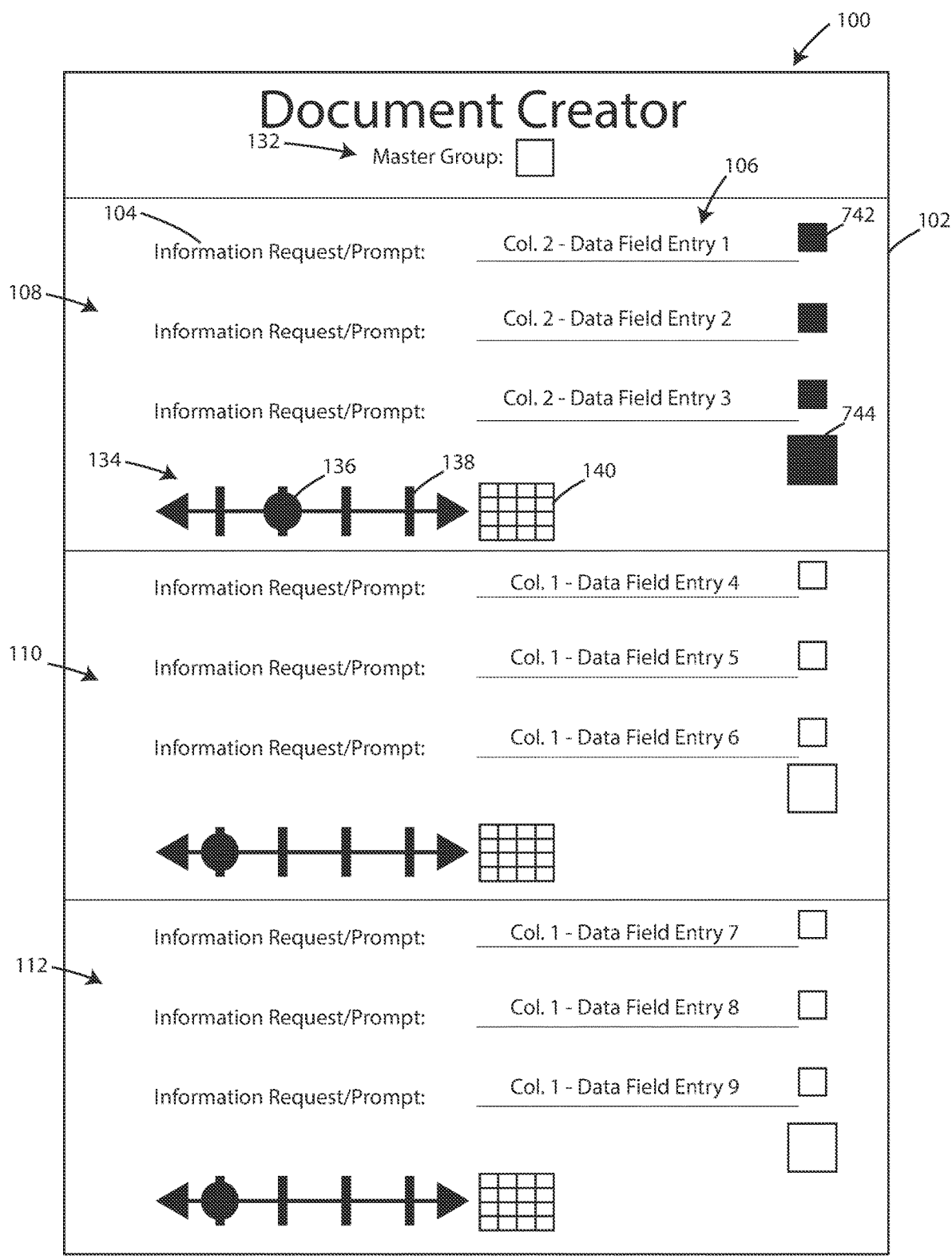
FIG. 7 is a schematic view of document creation system with a combination of data in accordance with various embodiments herein.

FIG. 7 shows a schematic view of document creation system with a combination of data in accordance with various embodiments herein. In various embodiments, each field can be provided with a field entry element 742. In some embodiments, a user can select the field entry element 742 to lock in or choose the data that is currently being displayed for a field as the data that the user wants to use for the document being created. In various embodiments, each field can include a field entry element 742, such that a user can individually lock in or select a data field.

In various embodiments, each group can be provided with a group entry element 744. In some embodiments, a user can select the group entry element 744 to lock in, confirm, or choose the data that is currently being displayed in the fields for an entire group as the data that the user wants to use for the document that is currently being created. In various embodiments, each group can include a group entry element 744, such that a user can lock in or select the currently displayed data for one of the groups. It is also possible for the group entry element to appear locked or selected upon selecting each of the field entry elements 742 for a given group. Once each of the fields has the data selected for a given group, the group itself can be confirmed, locked in, or selected. FIG. 7 shows the first group 108 with data from collection 2 confirmed or selected for use in the current document creation process. The remaining groups 110, 112 are still able to be modified and/or changed until the desired data is displayed in the given fields and confirmed by the user.

Figure 8:
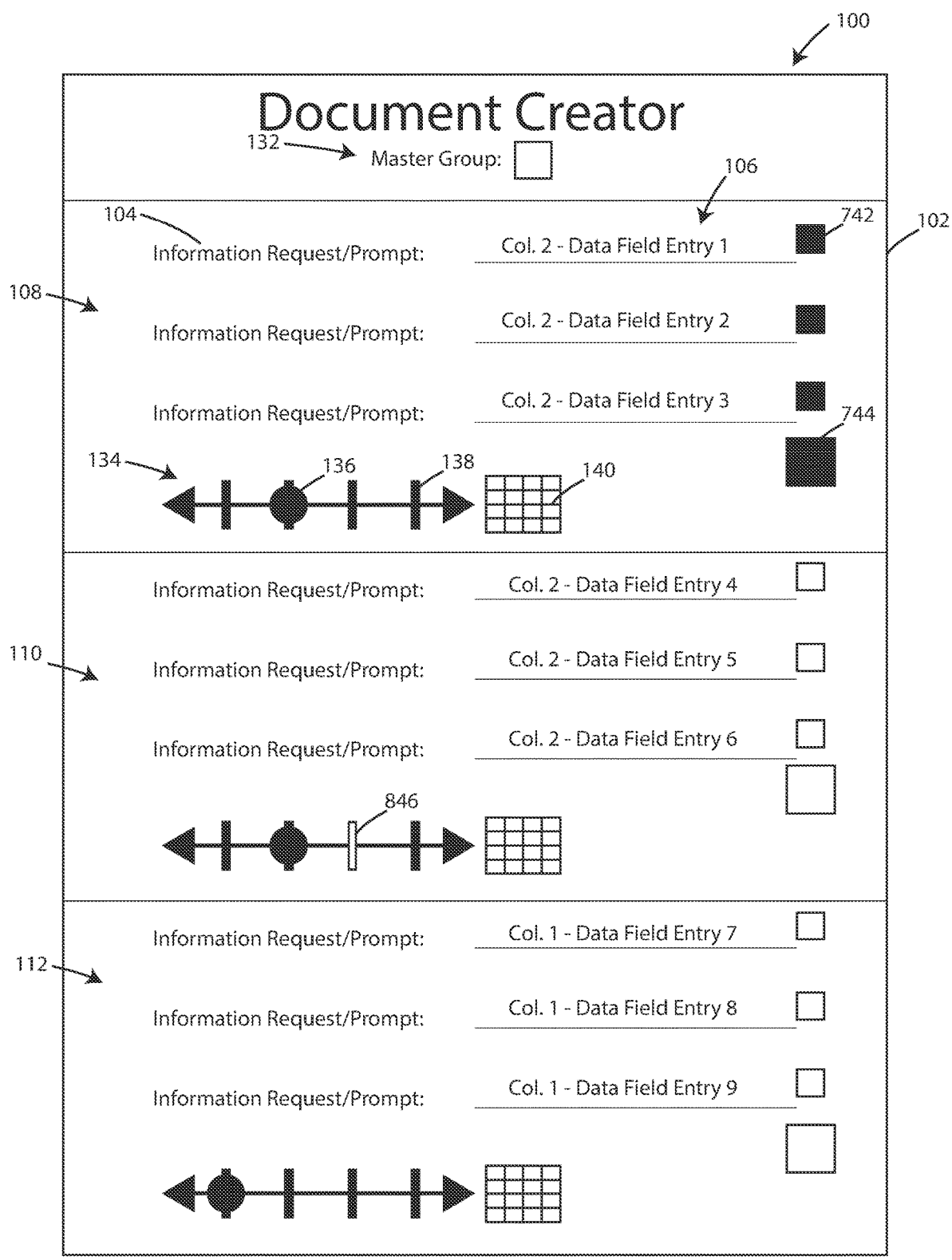
FIG. 8 is a schematic view of document creation system with a combination of data in accordance with various embodiments herein.

FIG. 8 is a schematic view of document creation system following FIG. 7 in accordance with various embodiments herein. In FIG. 8, the second group 110 is populated with data from collection 2. It is further shown that the selector icon 136 is on the second collection icon 138.

In some embodiments, the options available to a user can be reduced based on a previous selection or confirmation of data. As an example, confirming the data for the first group 108 in the step shown in FIG. 7 has reduced the available options for the second group in FIG. 8.

As shown in the FIG. 8, the third collection is unavailable for the user as shown by the collection icon 846 being greyed out or otherwise noted as unavailable. In some embodiments, a previous selection of data can create future options irrelevant, improper, or even impossible, as such those options can be removed from consideration for the user. As an example, if the document creation system is being used to prepare a job posting, and a previous data field require the user to select one of the company's locations, the future options can be reduced or restricted to only jobs that are performed at the selected/confirmed location. If the location selected was Washington, but assembly positions are located in Oregon, collections or data relevant to assembly positions can be automatically removed from consideration in response to the selection of Washington as the location.

Figure 9:
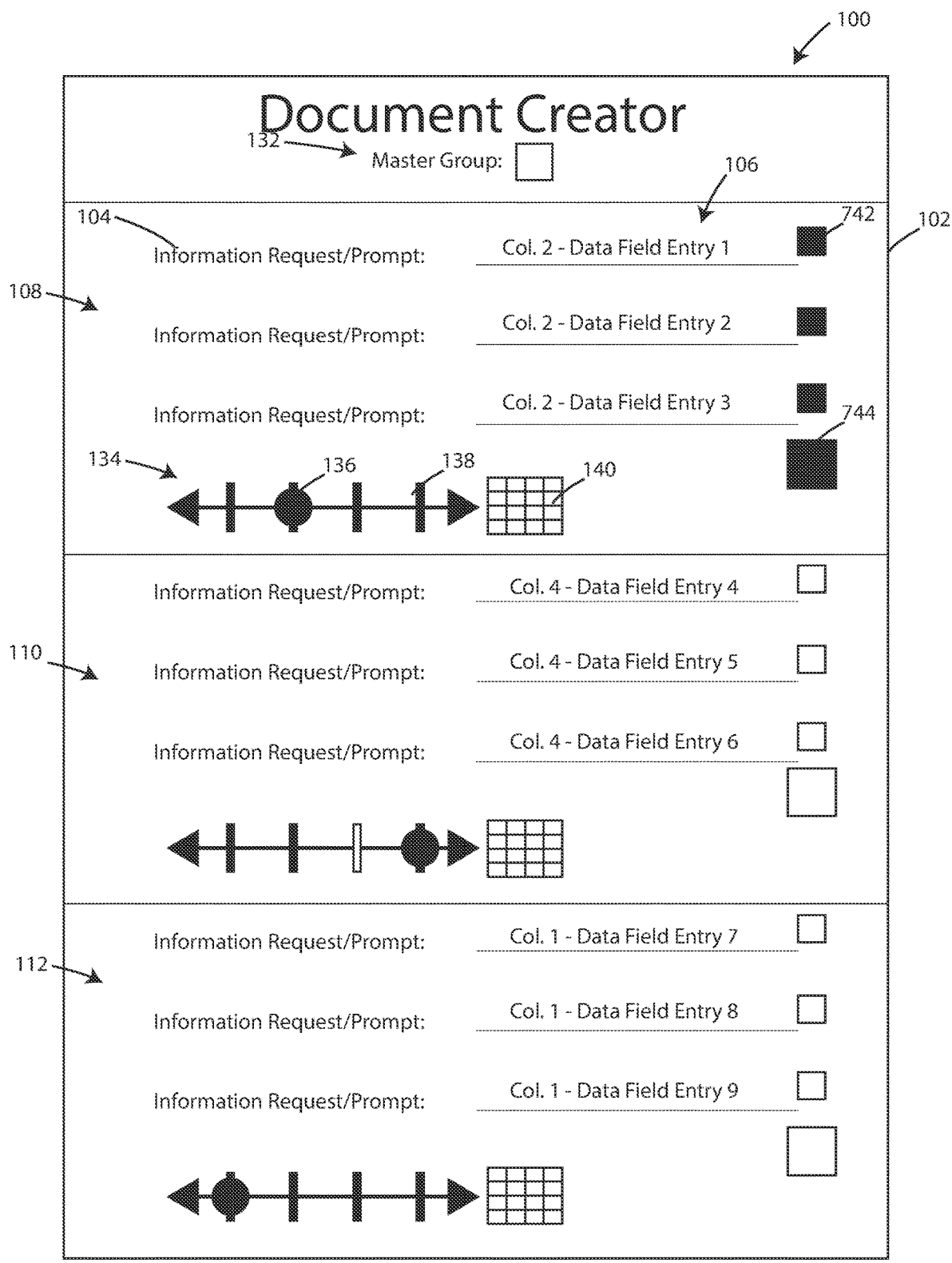
FIG. 9 is a schematic view of document creation system with a combination of data in accordance with various embodiments herein.

As the user rejects or denies the data from collection 2 for the second group 110, the data from collection 4 can be presented for the second group 110 as shown in FIG. 9. The data displayed for the second group can go from collection 2 in FIG. 8 to collection 4 in FIG. 9 because of collection 3 being removed from consideration due to a confirmation of at least some of the data in the first group 108.

Figure 10:
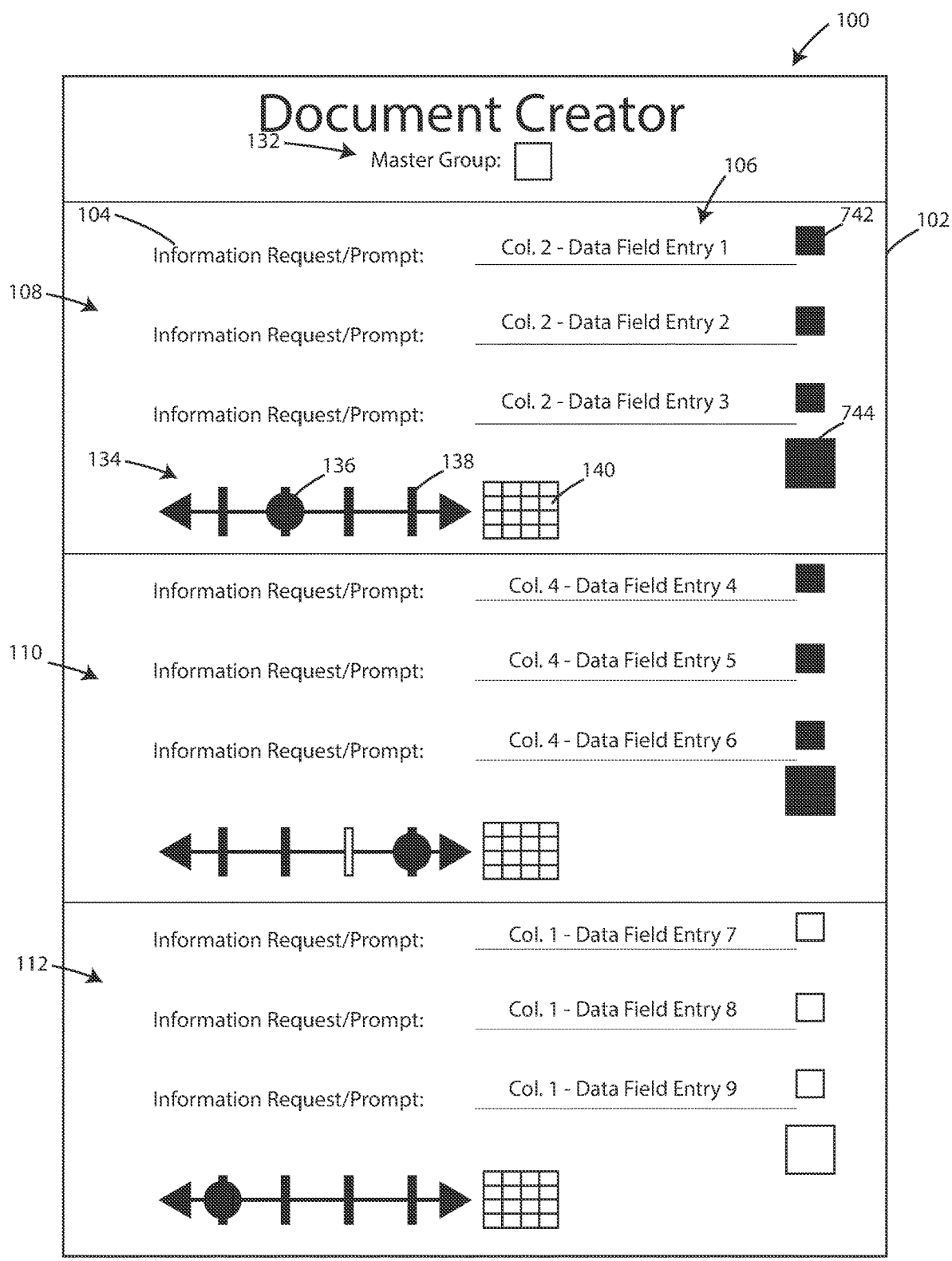
FIG. 10 is a schematic view of document creation system with a combination of data in accordance with various embodiments herein.
Figure 11:
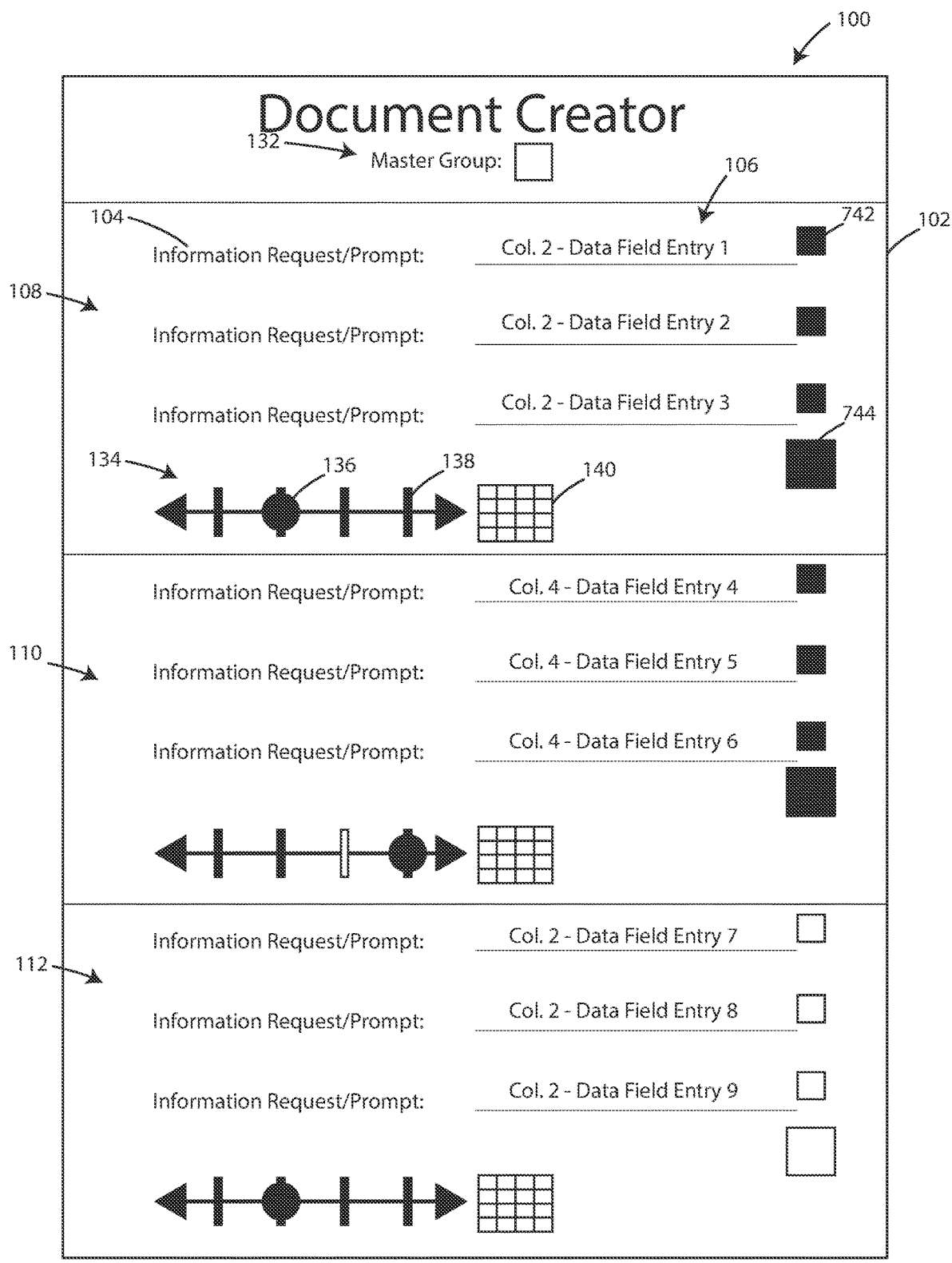
FIG. 11 is a schematic view of document creation system with a combination of data in accordance with various embodiments herein.

FIG. 10 shows the data from collection 4 has been confirmed or selected for the second group 110. FIG. 11 shows the user has denied or rejected the data from collection 1 for the third group 112 and now displays the data from collection 2 in the third group 112.

Figure 12:
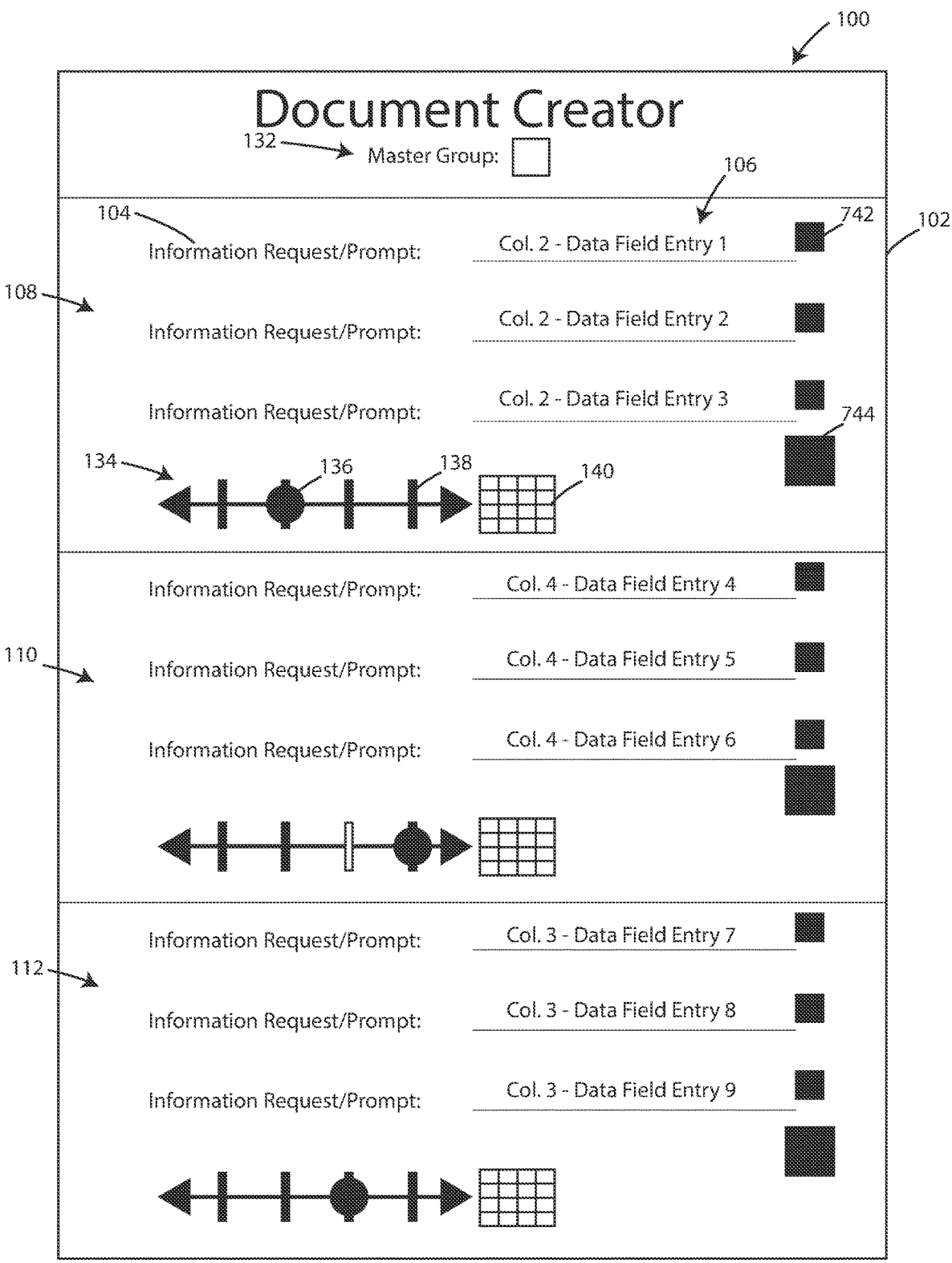
FIG. 12 is a schematic view of document creation system with a combination of data in accordance with various embodiments herein.

FIG. 12 shows the user has denied or rejected the data from collection 2 for the third group 112 and now displays the data from collection 3 in the third group 112. FIG. 12 further shows the user has confirmed or selected the data from collection 3 for the third group 112.

In various embodiments, a selection or confirmation of one portion of data can result in data from a collection not being available or removed from consideration from a subsequent group or data field, such as was shown in FIG. 8 with collection 3 being removed from consideration for the second group 110 based on a confirmation of at least a portion of the data for the first group 108. In various embodiments, the removal of consideration can be limited to a specific group or field. As shown in FIG. 12, the data of collection 3 was available and displayed in the third group 112 even though collection 3 was not available for the second group 110. The removal of consideration can have a limited scope, such as for a specific group or field.

Figure 13:
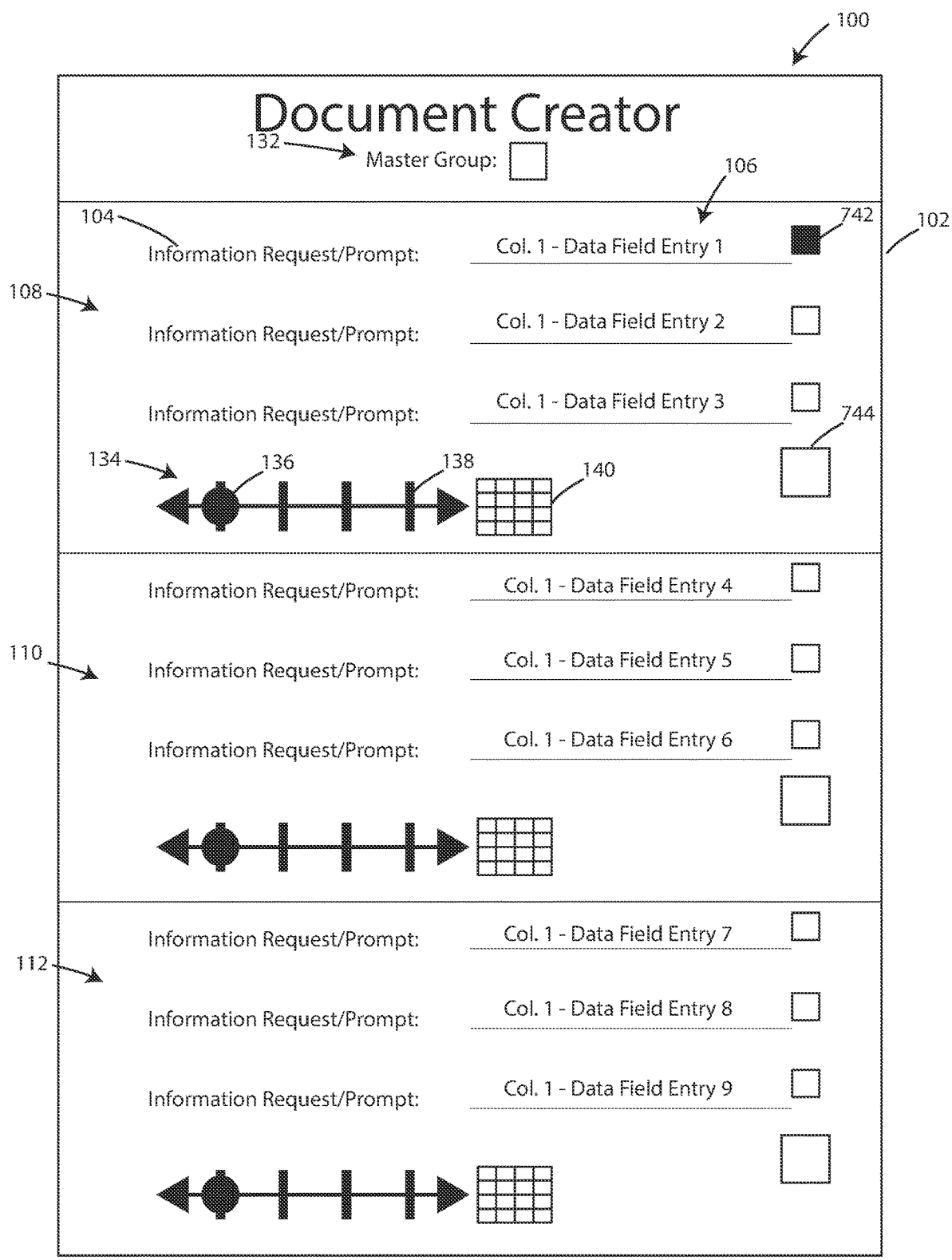
FIG. 13 is a schematic view of document creation system with a collection of data in accordance with various embodiments herein.

In addition to being able to select or confirm data on a group-by-group basis, the user interfaces, systems, and method described herein can also provide the ability to select or confirm data individually, such as by confirming a single data field. FIG. 13 shows a schematic view of document creation system with a collection of data in accordance with various embodiments herein.

In various embodiments, the user interface can allow a user to select or confirm data for a single data field 106 (sometimes referred to as "locking" that field). The user interface 100 can provide a field entry element 742. Selecting the field entry element can select or confirm the data that is currently displayed in the data field. FIG. 13 shows a confirmation of the first field 114 of the first group 108.

In various embodiments, the user interface can allow data from a different collection to be displayed in the other data fields within the group after at least one of the fields has had data selected or confirmed for a data field within the group. As an example, FIG. 13 shows confirmation of the data from collection 1 in the first field 114. The confirmation of the data from collection 1 in the first field can occur before the denial of the data for the remaining data fields within the group. The user can deny the data in the second field 116 and the third field 118, such as by advancing the selector icon 136 to an alternate collection icon 138.

Figure 14:
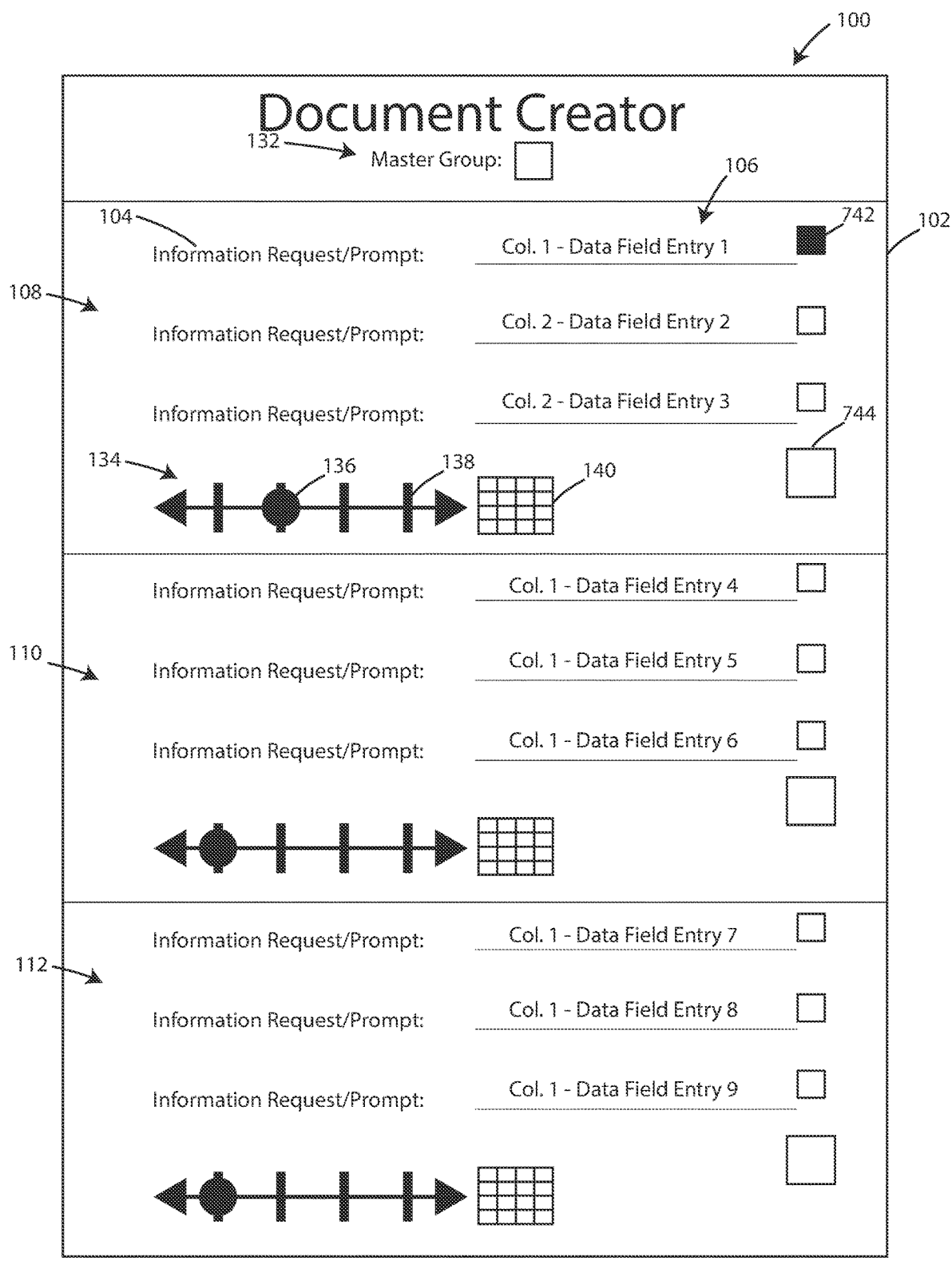
FIG. 14 is a schematic view of document creation system with a combination of data in accordance with various embodiments herein.

Upon receiving a denial of remaining unlocked or unselected data fields 106, the user interface 100 can display data from a different collection within those data fields 106, such as shown in FIG. 14. FIG. 14 shows the data from collection 2 being displayed or presented in the second field 116 and the third field 118.

Figure 15:
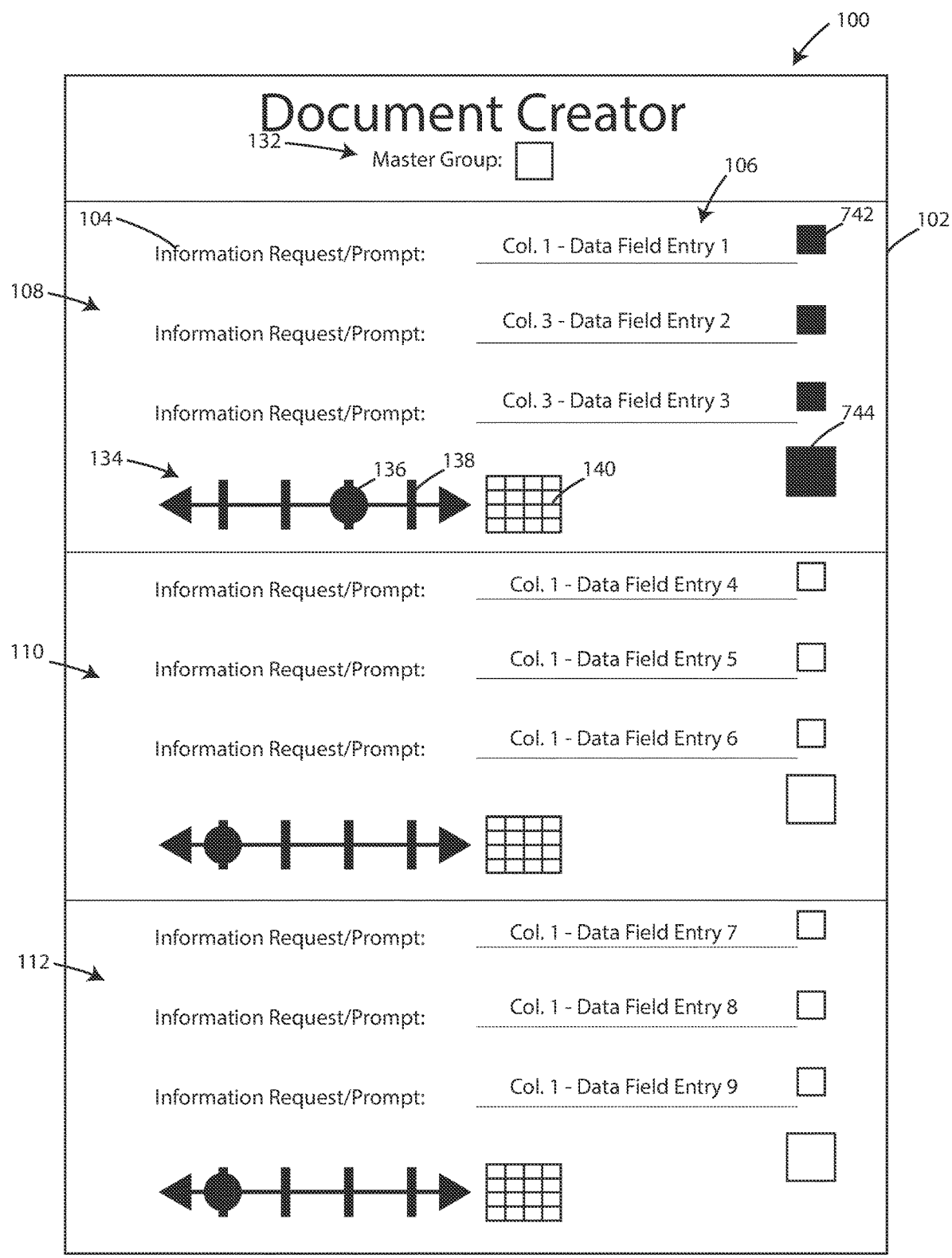
FIG. 15 is a schematic view of document creation system with a combination of data in accordance with various embodiments herein.

After displaying an additional collection in fields 116, 118 (collection 2 in FIG. 14), the user can provide confirmation or denial of some or all of the remaining unconfirmed data fields with the group. As an example, FIG. 14 shows collection 2 being presented in the second field 116 and the third field 118. The user denies collection 2 by moving to the next collection using group selector 134. As a result, the interface presents or displays collection 3 in the second field 116 and the third field 118 as shown in FIG. 15. FIG. 15 further shows that the data from collection 3 has been confirmed or selected for the second field 116 and the third field 118. The data fields 114, 116, 118 within the first group 108 have been fulfilled with confirmed data from collection 1 and collection 3 in FIG. 15.

Figure 16:
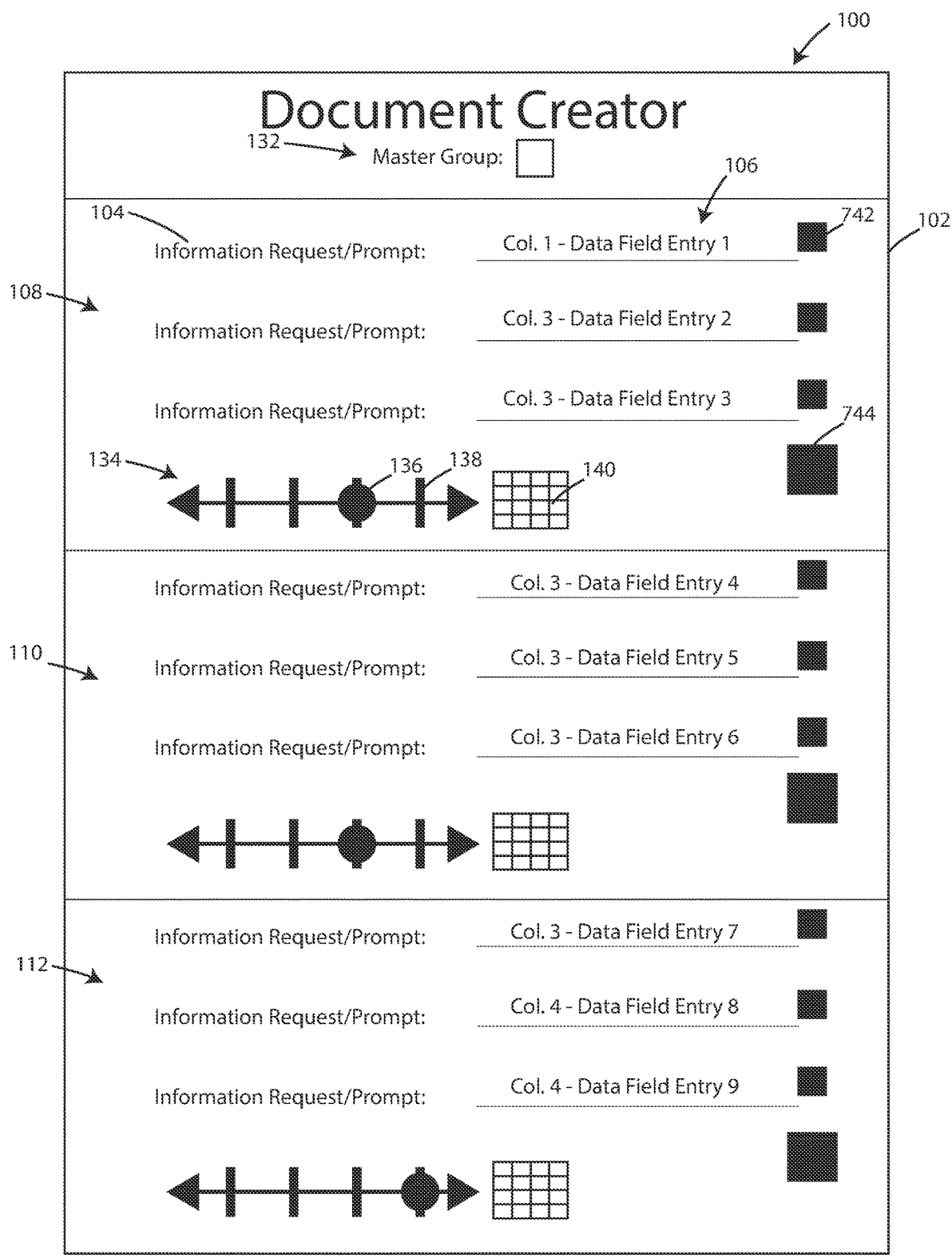
FIG. 16 is a schematic view of document creation system with a combination of data in accordance with various embodiments herein.

FIG. 16 is a schematic view of document creation system with a combination of data in accordance with various embodiments herein. After the example shown in FIG. 15, the user can eventually provide selections or confirm data for the entire frame 102. FIG. 16 shows a completed frame 102 that includes a combination of data from collection 1, collection 3 and collection 4.

Figure 17:
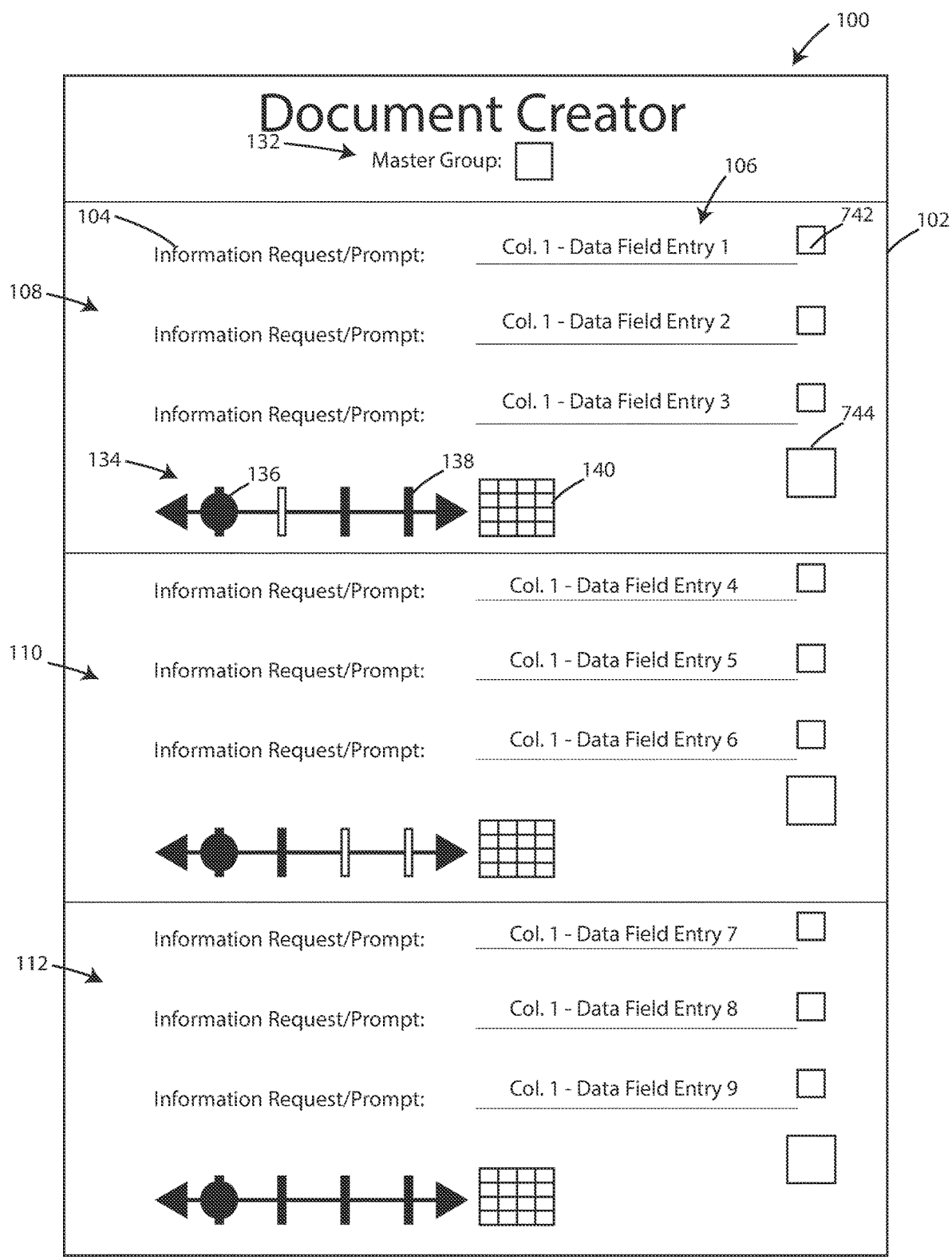
FIG. 17 is a schematic view of document creation system with a collection of data in accordance with various embodiments herein.

FIG. 17 shows a schematic view of document creation system with a collection of data in accordance with various embodiments herein. In some embodiments, a collection or a portion of a collection can be removed from consideration from the entire frame or from a sub-part of the frame (e.g. removed from consideration for a group). As discussed above, in some embodiments, a collection or a portion of a collection can be removed from consideration based on the confirmation of a previous portion of data. In some embodiments, duplicate data can be removed from consideration, such that data can be removed from consideration without the confirmation of data.

In various embodiments, if two or more collections include the same data for a group, the repetitive data can be removed from consideration (i.e. the repetitive data will not be presented to the user). In the embodiment shown in FIG. 17, collection 2 has been removed from consideration for the first group 108. Similarly, collections 3 and 4 have been removed from consideration for second group 110, such as a result of collection 3 and collection 4 having the same data as collection 1 or collection 2 for the second group 110.

Figure 18:
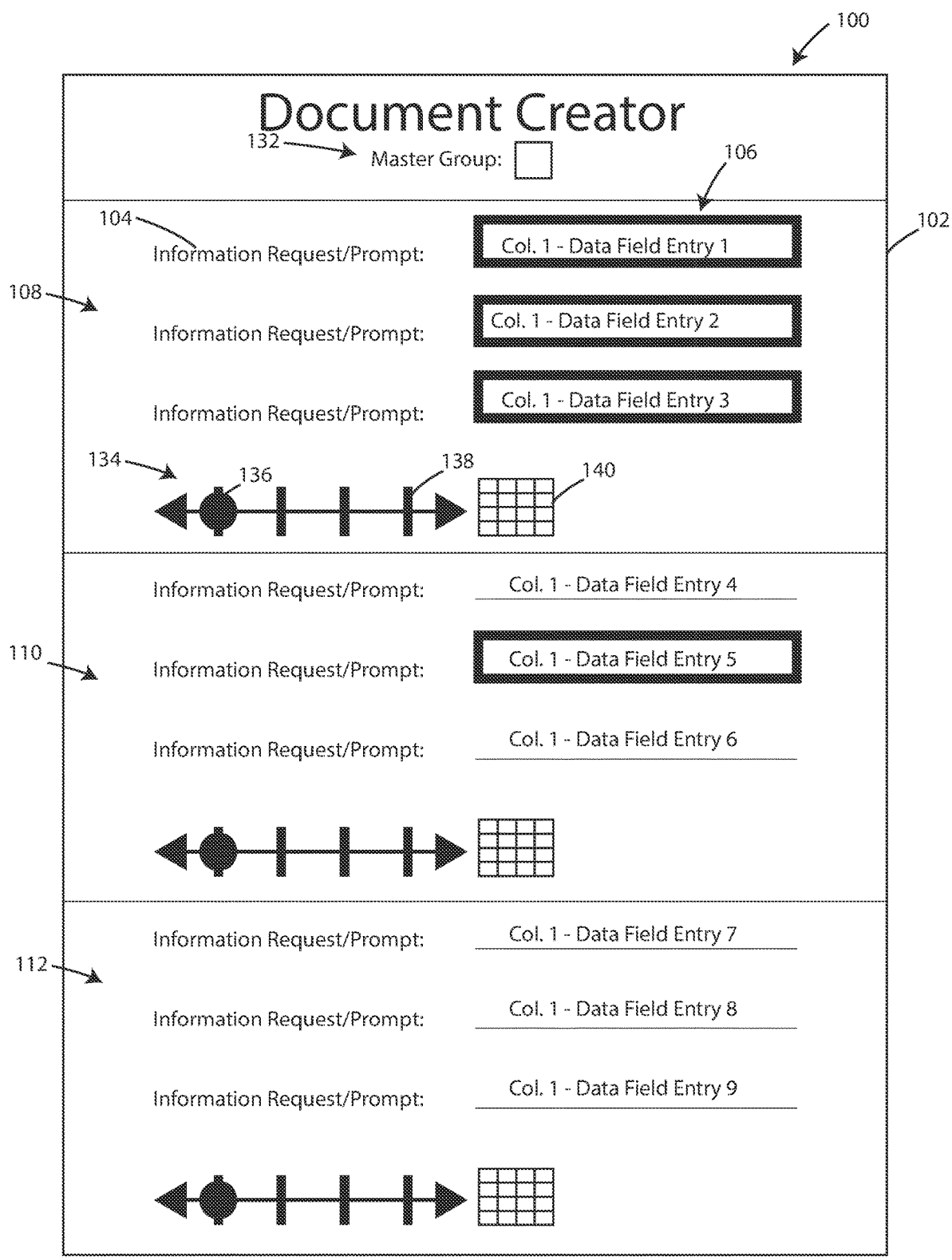
FIG. 18 is a schematic view of document creation system with a collection of data in accordance with various embodiments herein.

As discussed above, in various embodiments, the interface 100 can include a field entry element 742 for each data field 106. Other options for confirming or selecting data for a data field 106 are also possible. As an example, FIG. 18 shows a schematic view of a sub-part of the document creation system in accordance with various embodiments herein. In the example of FIG. 18, the user can select or click on the data field to confirm the data for that specific data field 106. FIG. 18 shows the first field 114, the second field 116, and the third field 118 as having data confirmed. In some embodiments, the user interface 100 can provide a visual indication that the data has been confirmed for the data field 106. In some embodiments, such as shown in FIG. 18, the data field 106 can be bolded. In other embodiments, the data field 106 can change color, such as being greyed out or highlighted. It will be appreciated that other ways to confirm or deny data are also possible and included in the scope of the disclosure.

FIGS. 19-21 show an example of the user interface for creating a document. The user interfaces, systems, and methods disclosed herein can be used in a wide variety of contexts. As an example, the creation of a job positing is depicted in the example shown in FIGS. 19-23. Other potential implementations for the embodiments disclosed herein include creating legal documents, such as a will or a contract, or creating a summary of an event, such as an article for a newspaper.

The example shown in FIGS. 19-23 relates to the creation of a job description for a job posting. Recruiters, hiring managers, or human resource personnel can create job descriptions for open positions that they are hiring for. In many instances, similar job postings have previously been created. The person creating the new job posting can make user of the previously entered data to create a new job posting in a more efficient manner. The person creating the new job posting does not need to retype or reenter all of the data that he/she (or another user) has previously entered. This can result in great time savings and a more enjoyable experience for the user.

FIG. 19 shows a first collection of data populating the data fields. FIG. 20 shows a second collection of data populating the data fields. FIG. 21 shows a second collection populating the first group and a third collection populating the second group 110 and the third group 112, such as because the user confirmed the data for the second collection for the first group 108.

After confirming data for all of the data fields 106 of the frame 102, the user can be presented with a preview of the finalized document, such as shown in FIG. 22. The user can be provided with the opportunity to provide any additional user inputs in the form of edits, changes, or additions to the document prior to creating or publishing the document. FIG. 23 shows an example of a final created document. After the document is created, the document can be published to the intended audience, such as printed or uploaded onto a website. In various embodiments, the final document or output can include content or data that was not part of the confirmed data in response to the frame prompts, such as additional text to provide context to the confirmed data. In some embodiments, the created document can omit some of the confirmed data, such as data that is related to responses to the created document. In the example shown in FIGS. 22 and 23, the hiring manager's information is not displayed with the job posting. However, responses to the job posting can be forwarded to the manager making confirmation of the manager's information important background data (or metadata) for the created document.

While only two complete collections are shown in FIGS. 19-20, it should be understood that additional complete collections can also be available. In addition to various number of collections, it is also possible for each collection and frame to include various number of portions or groups. While the figures show three groups 108, 110, 112, other numbers of groups are also possible and considered. Similarly, there can be various number of data fields 106 within each group.

As discussed above, in some embodiments, some portions of some collections can be removed from consideration, such as when the confirmation of a portion of the data makes a subsequent portion of data inappropriate, impossible, or otherwise not desirable. Some portions of some collections can be removed from consideration for other reasons too.

In various embodiments, some portions of data for some collections can also be removed from consideration when the portion of data is the same as other data that is in consideration. FIGS. 24-27 show schematics of how data can be removed from consideration in accordance with various embodiments.

FIG. 24 shows a plurality of collections 2446, 2448, 2450, 2452, 2454, 2456, 2458 with data entries for the fields of the first group 108, the second group 110, and the third group 112. FIG. 24 can represent a complete database of collections in consideration for a frame, such as collections of data that have previously been used to complete the frame.

In various embodiments, the system can remove duplicate entries from the complete database or the database of data that is in consideration. As shown in FIG. 25 when compared to FIG. 24, the data available for consideration and for being displayed to the user is reduced. The duplicate data has been removed from the database, such that only distinct entries remain in the database of available options. The determination of duplications is generally done based on all fields 106 in a group 108, 110, 112. The system can then remove any collection that is a duplicate for that group from consideration. As a result, there can be different numbers of available data for each of the groups 108, 110, 112. For example, the first group 108 shows that data from four collections remain. Data from collection 2452 is duplicative of collection 2445 within the first group 108, and is therefore removed. Similarly, data from collections 2456 and 2458 is duplicative of collection 2450. Note that the first two collections for the first group 108 in FIG. 25 both are for the same Job Category "Nurse," while the second two collections are for the Job Category "Custodian." This type of repetition is acceptable in many embodiments, which is why duplicates in these embodiments are determined by examining all fields 106 in the group 108. In some embodiments, however, the removal of duplicate data can be performed on a field-by-field basis, such that the removal is not dependent on other fields within the group or within the collection.

In various embodiments, confirmation of a first portion of data, such as a confirmation of data for the first group 108, can reduce the available data for the subsequent groups. In some embodiments, the confirmation of a portion of the data can reduce the available data for all of the subsequent groups to collections that have the same data as the confirmed portion of data. As shown in FIG. 26, the confirmation of "custodian," "entry custodian," and "basic janitorial" for the first group 108 reduces the data available for the second group 110 and the third group 112. In FIG. 26, the available options for the second group 110 and the third group 112 are reduced to collections that had the same data for the first group 108. In particular, the available options are selected from collections 2450, 2456, and 2458, which are those collections that contain the confirmed data "custodian," "entry custodian," and "basic janitorial" in the first group 108.

In some embodiments, the confirmation of a portion of the data can reduce the available data for less than all of the remaining groups. As show in FIG. 27, the confirmation of "custodian," "entry custodian," and "basic janitorial" for the first group 108 reduces the data available for the third group 112 (which relates to job skills), but not for the second group 110 (which relates to the location and hiring manager for the job).

The data shown in FIG. 27 can be presented through an interface 102 similar to that shown in FIGS. 1-21. A user that confirmed the "Custodian," "Entry Custodian," and "Basic Janitorial" data in the first group (such as by selecting group entry element 744) would be given five choices for the second group 110 (reflected in five collection icons 138 for that group selector 134) and three choices for the third group 112 (reflected in three collection icons 138 for that group selector 134). In other words, the number of collection icons 138 for each group selector 134 will depend on the result of the duplicate-removal process. Furthermore, the position of the selector icon 136 would directly no longer directly relate to a particular selected collection. The selector icon 136 being on the first collection icon 138 for the second group 110 would result in showing data "Minnesota," "Joan," and "100 Main Street" (which originated in collection 2446—the first collection on FIG. 24). In contrast, the selector icon 136 being on the first collection icon 138 for the third group 110 would result in showing data "Clean," and "Fun" (which originated in collection 2450—the third collection on FIG. 24).

In this context, it is frequently useful to sort (or otherwise reorganize) the non-duplicative data within each group 108, 110, 112 to make selecting data through interface 102 more intuitive. Although this sorting will reorganize the order of the data, the collections within the group remain together even after this sorting. This is because data entered into a particular collection 2446-2458 for a group will frequently have a logical connection to each other. Returning to FIG. 25, the data for the first group 108 might have a primary sort on the Job Category field (with the "Custodian" data being sorted before the "Nurse" data) with a secondary sort on the Job Title field (with "Entry Custodian" being sorted before "Lead Custodian"). This results in the first set of data being "Custodian," "Entry Custodian," and "Basic Janitorial"; and the last set of data being "Nurse," "Lead Nurse," "Manage Nurses." The sorting of each group 108, 110, 112 is independent from the other groups. For example, the group 110 might have a primary sort on the Location field 106 and a secondary sort on Hiring Manager field 106. In this way, the number of data entries, and the sorting of those entries, will differ between the groups 108, 110, 112. With this process, the first set of data presented for group one 108 is unlikely to be part of the same collection 2446-2458 as the first set of data for the second group 110 or the third group 112.

Figure 28:
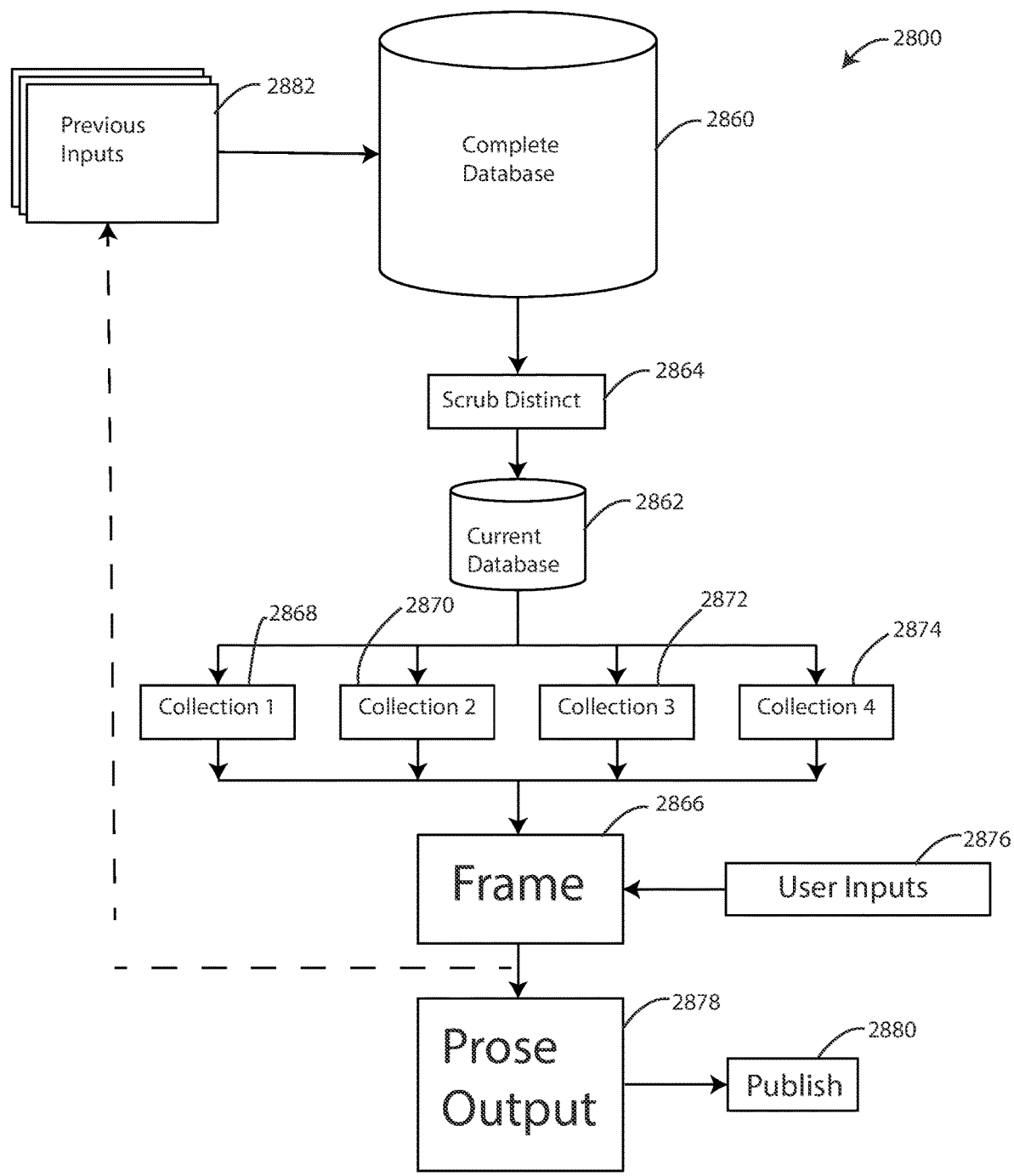
FIG. 28 is a schematic of a document creation system in accordance with various embodiments herein.

FIG. 28 shows a schematic of the data flow for the document creation system in accordance with various embodiments herein.

The system 2800 can include a complete database 2860. The complete database 2860 can include frames that have been used for the system and a plurality of collections or inputs used previously to complete the frames. In various embodiments, the data within the complete database 2860 can be grouped such that the collections are linked to the frame they are used to fulfill. The collections can be grouped with the frames, such that a collection is not presented to a frame in which it was not used to complete.

The complete database 2860 can include all of the potential collections or data. The current database 2862 can be a reduced subset of the data included in the complete database 2860. The current database 2862 can include the collections (or portions of collections) that are in consideration for completing at least part of the frame. In various embodiments, the current database 2862 can include a plurality of collections that are available for completing the frame. In some embodiments, the current database 2862 can include the collections or portions of collections that can be presented to a user for completing a current frame. In some embodiments, the complete database 2860 can be reduced by removing duplicate entries, such as with a scrub distinct command 2864, to establish an initial current database 2862. The determination of distinction can be based on all fields within a group, as described above. The current database 2862 can be further reduced by removing other collections or portions of collections, such as in response to a user confirming a portion of data.

The collections 2868, 2870, 2872, 2874 can be separated, such that each collection 2868, 2870, 2872, 2874 or a portion of each collection 2868, 2870, 2872, 2874 can be individually presented to the user through the user interface as completing a portion of the frame 2866. In some embodiments, grouped portions of the collections are separately sorted. In other embodiments, the association between grouped portions and the original collection are maintained between the groups. The user provides inputs 2876 to confirm or deny displayed data as the desired data entry for each group or field of the frame 2866. In various embodiments, the user input 2876 can include adding new or additional data that was not previously included as an input to a frame. In such an embodiment, the user interface can allow the user to type or otherwise input new data into one or more of the data fields.

Upon completing the frame 2866, such as by entering or confirming data for each of the data fields of the frame, the user can be presented with the option to provide additional input as editing or changing parts of the output, such as discussed in connection with FIG. 22. In various embodiments, the system 2800 can produce an output, such as a prose output containing words and/or sentences based on the frame 2866, collection 2868, 2870, 2872, 2874, and the user inputs 2876. The pose output 2878 can be published 2880, such as printed for signing or uploaded to a website for public viewing.

In various embodiments, the system 2800 can include adding the newly created collection to complete the frame 2866 as a previous input 2882, which can be saved into the complete database 2860 for use in completing a future frame.

Figure 29:
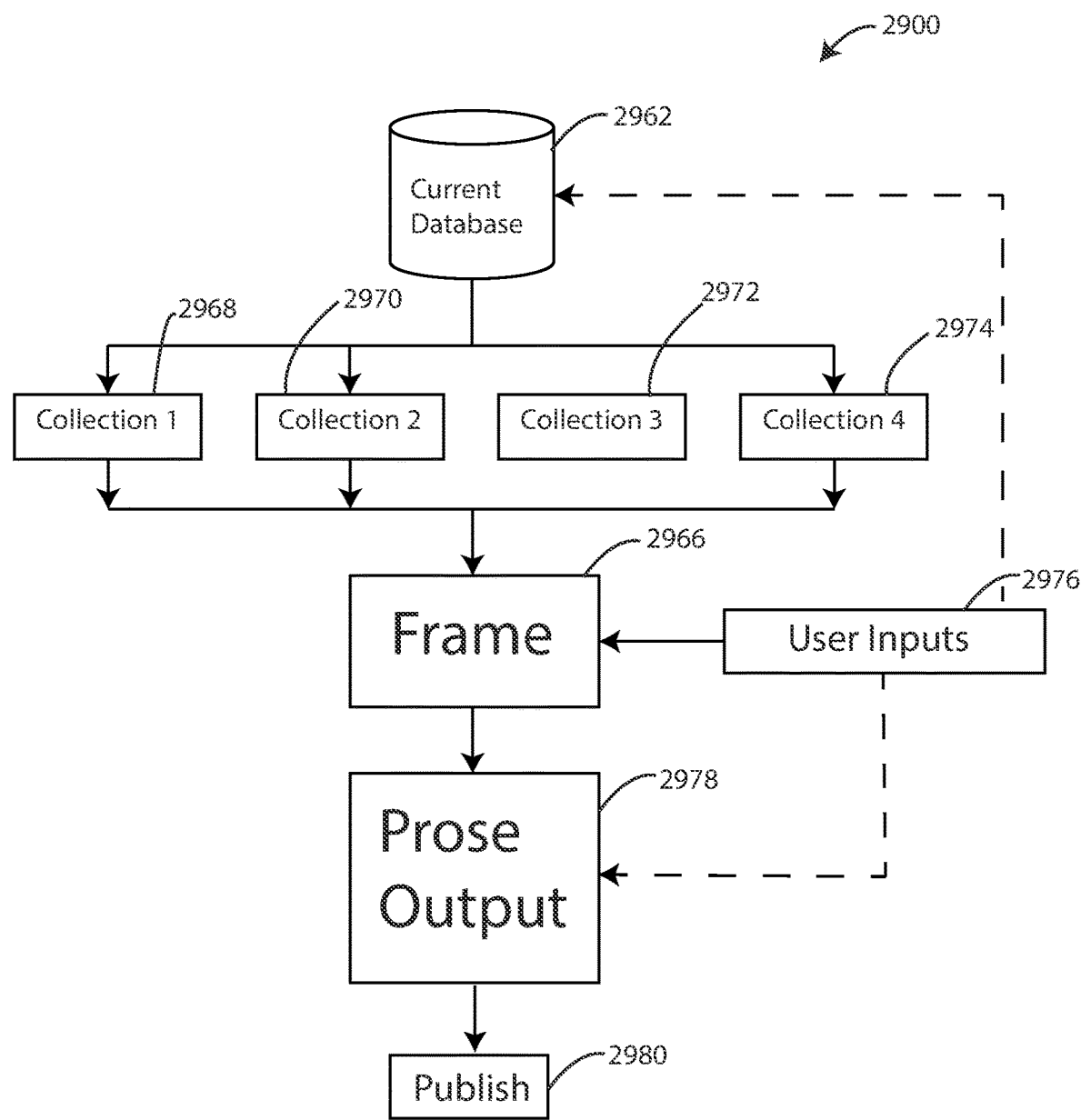
FIG. 29 is a schematic of a document creation system in accordance with various embodiments herein.

FIG. 29 shows a schematic of data flow for the document creation system in accordance with various embodiments herein. In various embodiments, the system 2900 can change how data is presented or flows based on user inputs. As discussed above, a user input 2976, such as confirming a portion of data, can affect future options that will or will not be presented to the user through the user interface. User inputs 2976 can also determine which portions of data will be confirmed and which portions of data will be denied for completing the frame 2966. In various embodiments, user inputs 2976 can also be applied to the created document or prose output 2978, such as by editing the document prior to publishing or creating the document.

The current database 2962 can include collections or portions of collections that are in consideration for completing the frame 2966. The current database 2962 can include collections or portions of collection that can be presented to the user through the user interface. In some embodiments, a user input 2976 can reduce the potential collections or a portion of the potential collections available for completing the frame 2966. As shown in FIG. 29, a plurality of collections 2968, 2970, 2972, 2974 can be used for completing the frame 2966. However, based on a user input 2976, collection 3 2972 can be removed from the current database 2962 or simply not presented to the user as indicated by the discontinuity in the dataflow shown in FIG. 29. Upon completing the frame 2966, the prose output 2978 can be created and published 2980.

Figure 30:
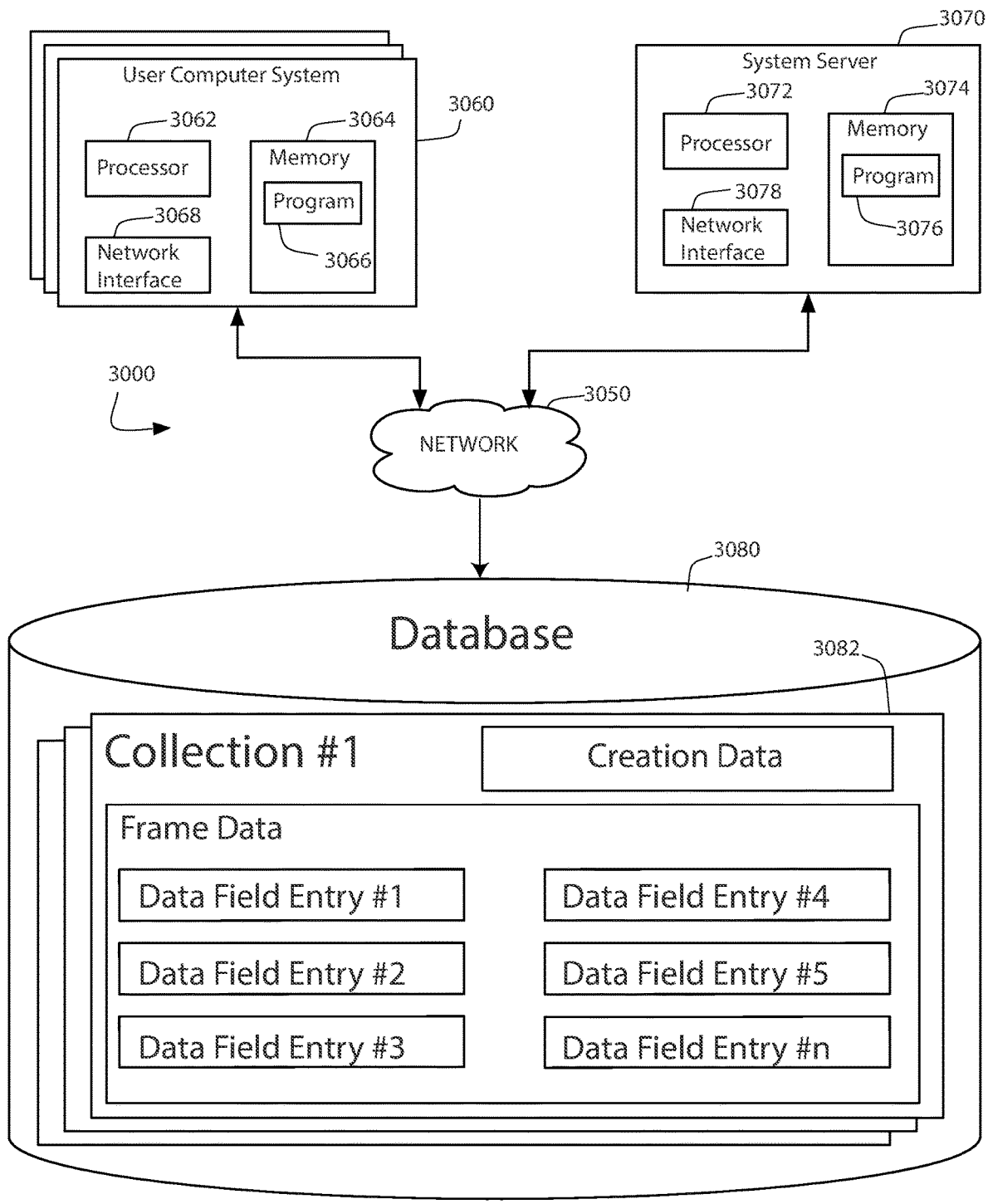
FIG. 30 is a schematic of a document creation system in accordance with various embodiments herein.

FIG. 30 is a schematic of various components in or supporting the document creation system 3000 in accordance with various embodiments herein. The system 3000 can include a user computer system 3060, a system server 3070, and a database 3080. These components 3060, 3070, 3080 can be connected or linked together by network 3050.

The user computer system 3060 is a computing device that includes a processor for processing computer programming instructions. In most cases, the processor is a CPU, such as the CPU devices created by Intel Corporation (Santa Clara, CA), Advanced Micro Devices, Inc. (Santa Clara, CA), or a RISC processor produced according to the designs of Arm Holdings PLC (Cambridge, England). Furthermore, computer system 3060 has memory 3064, which generally takes the form of both temporary, random access memory (RAM) and more permanent storage such a magnetic disk storage, FLASH memory, or another non-transitory (also referred to as permanent) storage medium. The memory and storage (referred to collectively as "memory") contain both programming instructions and data. In practice, both programming and data can be stored permanently on non-transitory storage devices and transferred into RAM when needed for processing or analysis. In some embodiments, the computer system 3060 may include a graphics processing unit (or GPU) for enhanced processing of visual input and outputs, such as to display the user interface, or an audio processing board, a single chip audio processor, or a digital signal processor (or DSP) that accelerates the processing of audio inputs and outputs.

It should be understood that the receiving, processing, analyzing, and storage of data can take place at the computer system 3060 or at a remote server, such as system server 3070. Discussion of the steps taken with data can be understood to apply to both the computer system 3060 and the server 3070.

The computer system 3060 or the system server 3070 can also tasked with making sure that data is safely stored. The data can be stored locally, or it can be stored remotely. In FIG. 1, the data is stored in database (also referred to as data) 3080. This database 3080 can include defined database entities that may constitute database tables in a relational database. In other embodiments, these entities constitute database objects or any other type of database entity usable with a computerized database. In the present embodiment, the phrase database entity refers to data records in a database whether comprising a row in a database table, an instantiation of a database object, or any other populated database entity. Data within this database 3080 can be "associated" with other data. This association can be implemented in a variety of techniques depending on the technology used to store and manage the database, such as through formal relationships in a relational database or through established relationships between objects in an object-oriented database.

Although this database 3080 is shown as being connected to the user computer system 3060 over network 3050, the data 3082 can be stored locally to the user computer system 3060 or the system server 3070. FIG. 30 shows the database 3080 comprising collection data 3082. Each collection data profile can include frame data, data field entry data, creation data and additional data related to the systems and methods disclosed herein.

The computer system 3060 can be generally responsible for coordinating the various elements of the systems and method disclosed herein. For instance, the computer system 3060 can be configured to display the disclosed user interfaces to a user and to determine which data will be presented and when the data will be presented to the user.

The computing systems 3060, 3070 can each include a processor 3062, 3072, memory and/or storage 3064, 3074, and a network interface 3068, 3078 to allow communications over network 3050. The memory 3064, 3074 is shown in FIG. 30 as containing computer programming 3066, 3076 that controls the processor 3062, 3072.

In FIG. 30, the system server 3070 is represented as a single computing device. Nonetheless, it is expected that some embodiments will implement the system server 3070 over multiple computing devices all operating together through common programming as a single system server 3070.

In some embodiments, the user can refer to the decision maker. The user can be presented with a frame and various collections or portions of collections for completing the frame. The user computer system 3060 can take the form of a mobile device such as a smartphone or tablet computer. If the user computer system 3060 is a standard computer system, it can operate custom application software or browser software 3066 that allows it to communicate over the network 3050 as part of the system 3000. In particular, the programming 3066 can at least allow communication with the system server 3070 over the network 3050.

Note that even though FIG. 30 shows that collection data 3080 is found in the database 3080, there is no need for all the data to be physically or logically stored in a single structure. FIG. 30 merely schematically groups data into a single element for ease in understanding the system. Nonetheless, relationships between certain types of data will drive the systems and methods described below, so it will be necessary to analyze and compare much of the data shown with other data.

Figure 31:
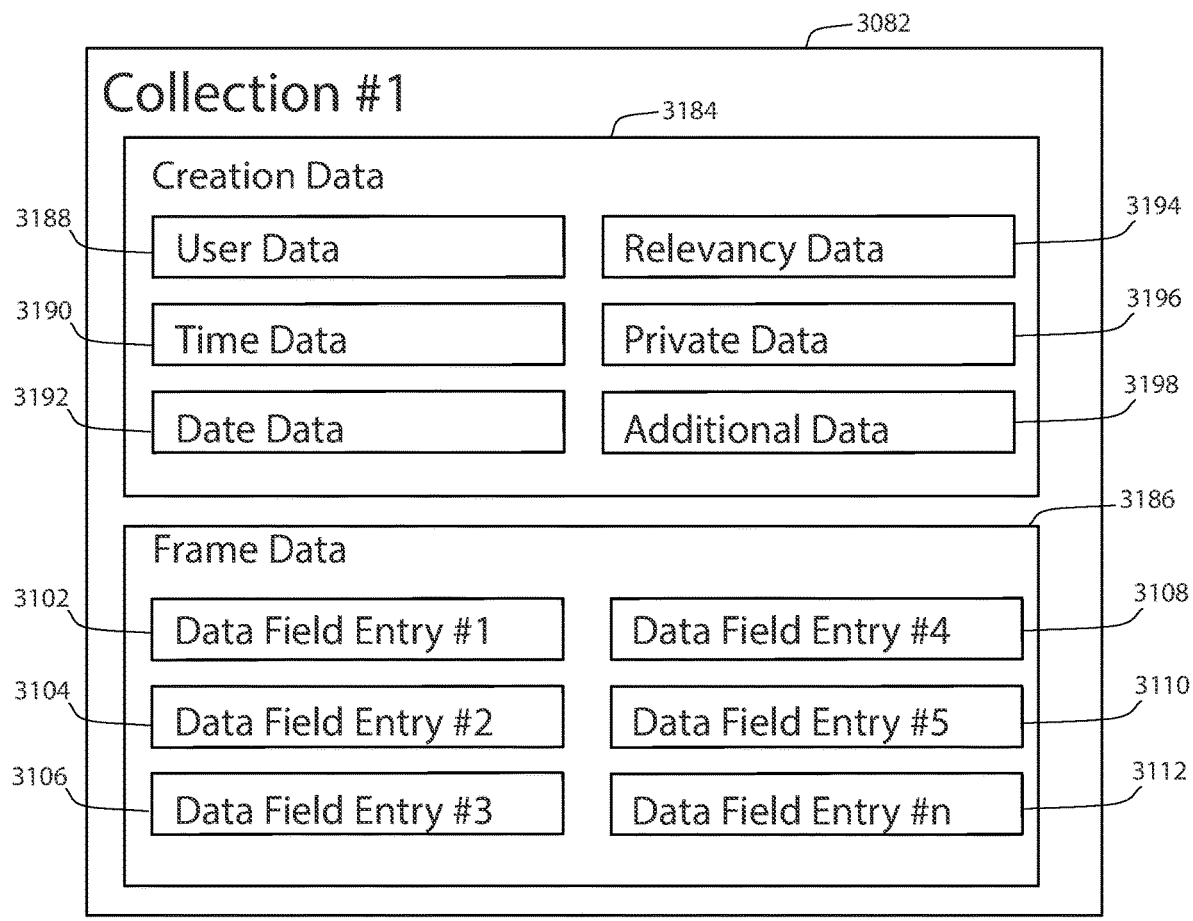
FIG. 31 is a schematic of a collection of data in accordance with various embodiments herein.

FIG. 31 is a schematic of collection data 3082 in accordance with various embodiments herein. The collection data 3082 can include creation data 3184 and frame data 3186. In various embodiments, creation data 3184 can include data that is not part of the prose output. In some embodiments, the creation data can include user data 3188, time data 3190, date data 3192, relevancy data 3194, private data 3196, and any additional data 3198.

User data 3188 can include data regarding which user created the collection and the save data. Time data 3190 can include data regarding the time at which the collection was created. Date data 3192 can include data about when the collection was created. Relevancy data 3194 can include data about what the current collection data is relevant to, such as the subject matter included or for which frame the collection fulfills. Relevancy data 3194 can also include data about which portions of the frame data 3186 should exclude or remove frame data from other collections upon the confirmation of a portion of the collection data. Private data 3196 can include data regarding whether or not the collection data should be provided to other users for access when completing a frame. In some embodiments, the collection data can be restricted to the user that created the data, such as to keep data private. The additional data 3198 can include other types of data that can be saved for each collection.

The frame data 3186 can include data field entry data 3102, 3104, 3106, 3108, 3110, 3112. The data field entry data can include data for responding to a prompt of a frame, such as the data that is displayed to the user through the user interface. The data field entry data can further include relationship data for removing data from consideration upon confirmation of other data for responding to a prompt.

Figure 32:
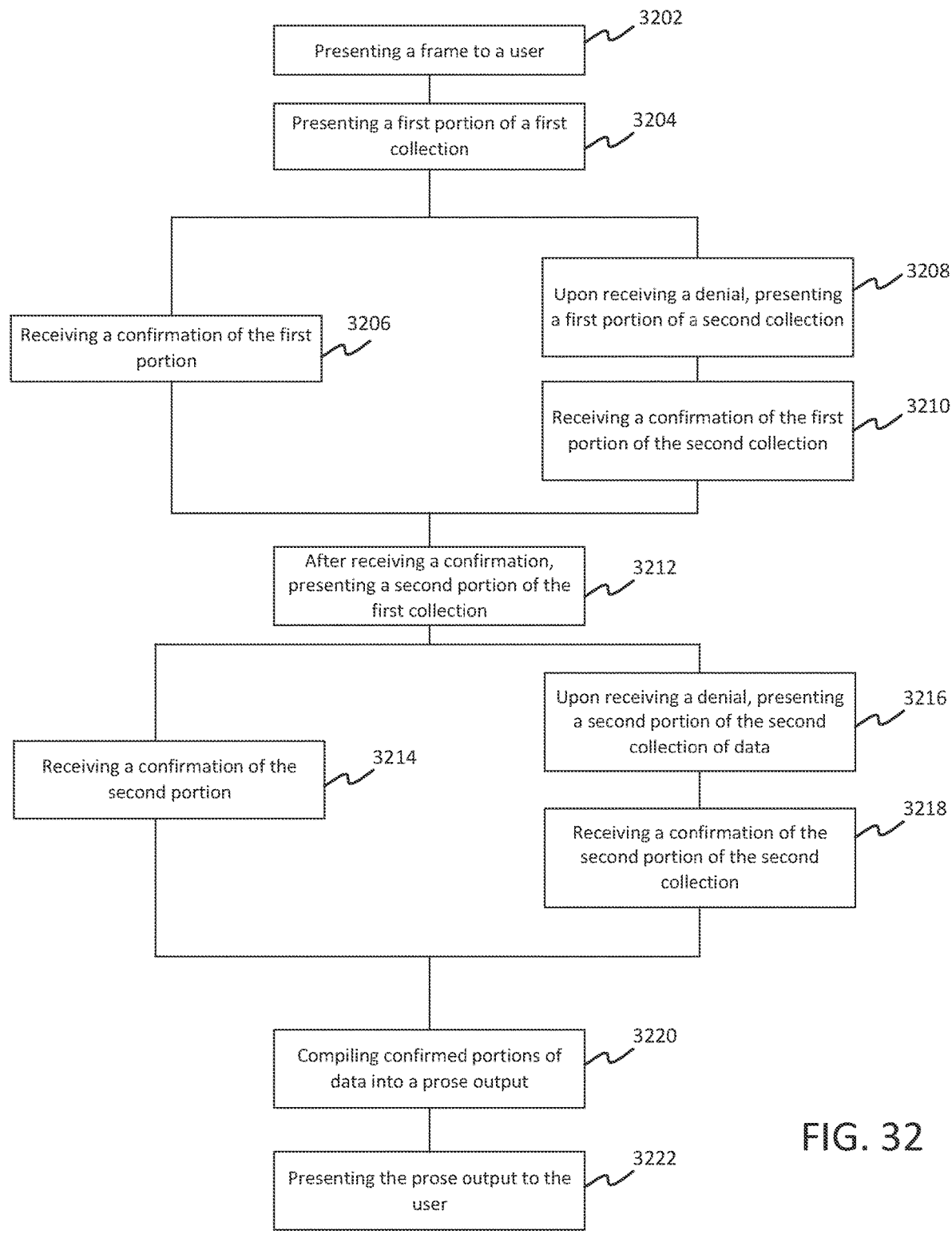
FIG. 32 is a flowchart depicting a method in accordance with various embodiments herein.

FIG. 32 is a flowchart depicting a method in accordance with various embodiments herein. The method can include presenting a frame to a user 3202. In various embodiments, the method can include presenting a first portion (i.e., first group) of a first collection of data 3204. The method can include receiving a confirmation or a denial of the first portion of the first collection for the first group from the user, with step 3206 being the receipt of a confirmation. The method can include, upon receiving a denial, presenting a first portion of a second collection of data for the first group 3208. The method can include, if a denial of the first portion of the first collection was received, receiving a confirmation of the second collection for the first group from the user 3210. The method can include, after receiving a confirmation of either (1) the first portion of the first collection or (2) the first portion of the second collection, presenting or continuing to present a second portion of the first collection of data 3212. The method can include receiving a confirmation 3214 or a denial 3216 of the second portion of the first collection for the second group from the user. The method can include, upon receiving a denial, presenting a second portion of the second collection of data for the second group 3216. The method can include, if a denial of the second portion of the first collection was received, receiving a confirmation of the second portion of the second collection for the second group from the user 3218. Although FIG. 32 shows receiving a confirmations or denials related to a first portion, the process of confirmations and denials can relate to any of the portions of the frame. The method can include compiling confirmed portions of data into a prose output 3220. The method can include presenting the prose output to the user through a user interface 3222.

The method can further include receiving edits to the prose output from the user, such as edits or additions to the prose output. The method can further include saving confirmed portions of data as a new collection, such as a collection that can be used in a future document creation process. In various embodiments, the method can further include receiving a request to present the first portion of the first collection for the first group after previously receiving a denial of the first portion of the first collection for the first group, such as the user requesting a previously displayed portion of data to be redisplayed.

Figure 33:
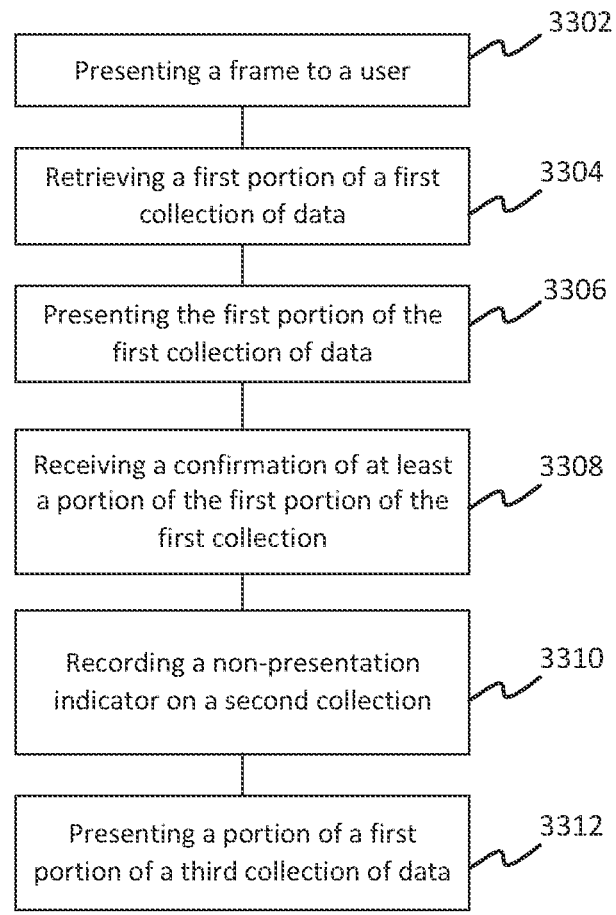
FIG. 33 is a flowchart depicting a method in accordance with various embodiments herein.

FIG. 33 is a flowchart depicting a method in accordance with various embodiments herein. The method can include presenting a frame to a user 3302. In various embodiments, the method can include retrieving a first portion (i.e., first group) of a first collection of data from a collection database (i.e., current database) 3304. The collection database can include a plurality of collections of data. Each collection of data can be divided into portions or groups. Each collection of data can include entries that were previously entered in completing a similar frame. In various embodiments, the method can include presenting the first portion of the first collection of data 3306, such as within the frame. In various embodiments, the method can include receiving a confirmation of the first field data entry of the first portion of the first collection for the first field of the first group from the user 3308. In various embodiments, the method can include, in response to receiving confirmation of the first field data entry, recording a non-presentation indicator on a second collection from the collection database 3310. In some embodiments a non-presentation indicator causes the removal of data from the second collection from the collection database for consideration in completing the first group of the frame. In various embodiments, the method can include presenting a second field data entry of a first portion of a third collection of data 3312.

In various embodiments, the method can further include presenting a second portion (i.e., second group) of the first collection. In various embodiments, the method can further include receiving a confirmation or a denial of the second portion of the first collection for the second group from the user. In various embodiments, the method can further include, upon receiving a denial, presenting a second portion of the third collection of data for the second group. In various embodiments, the method can further include, if a denial of the second portion of the first collection was received, receiving a confirmation of the second portion of the third collection for the second group from the user. In various embodiments, the method can further include, compiling confirmed portions of data into a prose output. In various embodiments, the method can further include presenting the prose output to the user through a user interface.

Figure 34:
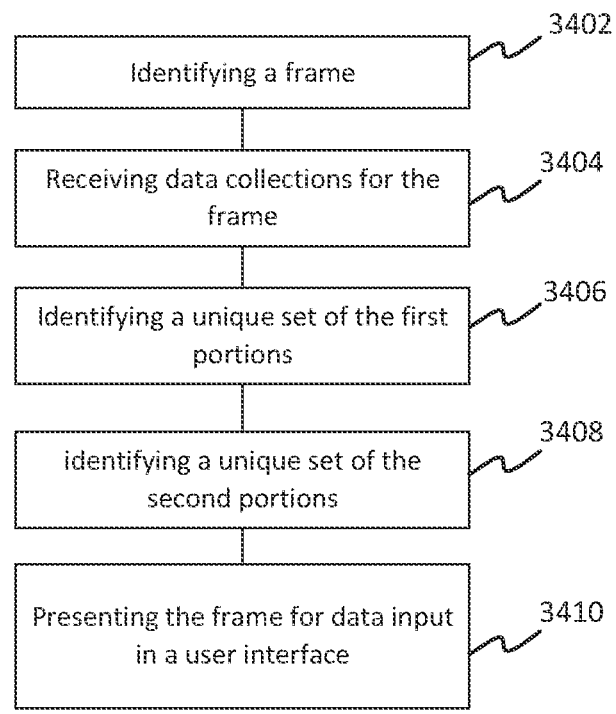
FIG. 34 is a flowchart depicting a method in accordance with various embodiments herein.

FIG. 34 is a flowchart depicting a method in accordance with various embodiments herein. In various embodiments, a method for presenting an improved user interface can be provided. In various embodiments, the method can include identifying a frame comprising a plurality of data fields 3402. In various embodiments, the first and second data groups each include plurality of fields.

In various embodiments, the method can include receiving data collections for the frame 3404. Each of the data collections can include a first portion that aligns with the first group and a second portion that aligns with the second group. In various embodiments, the method can include identifying a unique set of the first portions 3406, such as by removing duplicate portions or sections of data from consideration. In various embodiments, the method can include identifying a unique set of the second portions 3408, such as by removing duplicate portions or section of data from consideration. In various embodiments, the unique sets relate to different subsets of data collections, such that each unique set can be from a different collection. In some embodiments, the unique set of first portions and the unique set of second portions can be sorted. In various embodiments, the method can include presenting the frame for data input in the user interface 3410. In various embodiments, the user interface can include a first interface element to select from among the unique set of first portions. The user interface can further include an element to receive a confirmation of a unique set of the first portion for using in creating the current document. The user interface can further include a second interface element to select from among the unique set of second portions. The user interface can further include an element to receive a confirmation of a unique set of the second portion for using in creating the current document.

Figure 35:
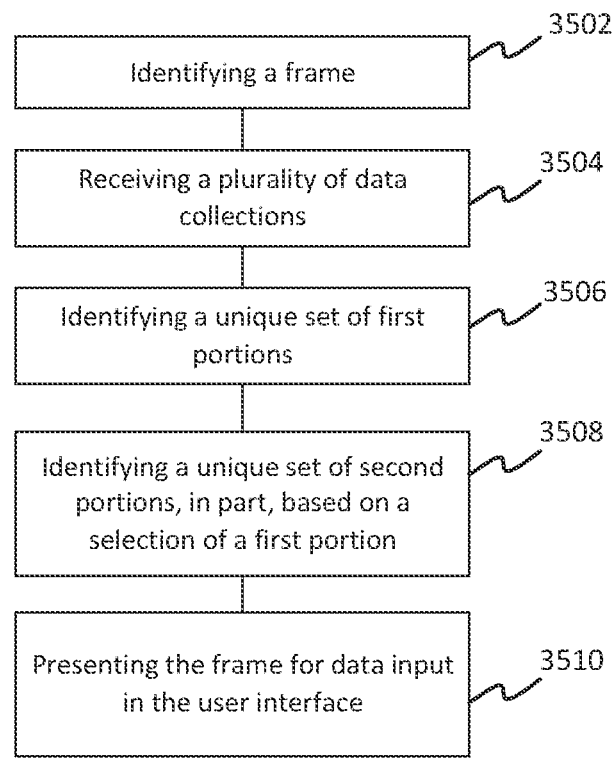
FIG. 35 is a flowchart depicting a method in accordance with various embodiments herein.

FIG. 35 is a flowchart depicting a method in accordance with various embodiments herein. Various embodiments can provide a method for presenting an improved user interface for data entry based on prior entries. In various embodiments, the method can include identifying a frame comprising a plurality of data fields 3502. In various embodiments, the data fields in the frame are grouped into a first data group and a data second group. The first group can include a first plurality of data fields. The second group can include a second plurality of data fields.

In various embodiments, the method can include receiving a plurality of data collections for the frame 3504. Each data collection can include a first portion of data entries for the first group and a second portion of data entries for the second group.

In various embodiments, the method can include identifying a unique set of the first portions of the data entries 3506. In various embodiments, each first portion relates to a single data collection, such as the first portion has a data collection as its original origin. In various embodiments, identical first portions from different data collections are scrubbed from the unique set of the first portions to remove duplicates, such that the unique set of the first portions includes the first portions of a first subset of all the plurality of data collections.

In various embodiments, the method can include identifying a first unique set of the second portions of the data entries 3508. In various embodiments, each second portion relates to a single data collection. In various embodiments, identical second portions from different data collections are scrubbed from the first unique set of the second portions to remove duplicates so that the first unique set of the second portions includes the second portions of a second subset of all the plurality of data collections that is different than the first subset of all the plurality of data collections. The first unique set of first portions and the first unique set of second portions can be separately sorted into different presentation orders.

In various embodiments, the method can include presenting the frame for data input in the improved user interface to a user 3510. The user interface can include the first group of the frame having a first interface element to select from among the unique set of first portions of the data entries in a first presentation order, and the second group of the frame having a second interface element to select from among the first unique set of second portions of the data entries in a second presentation order.

In various embodiments, the selection of a particular value in a particular field in the first group presented in the user interface causes the creation of a second unique set of the second portions, wherein only second portions from data collections having the particular value in the particular field are included in the second unique set of second portions, further wherein the second unique set of second portions are scrubbed to remove duplicates, still further wherein the second interface elements then selects from second unique set of second portions of the data entries.

It should be noted that, as used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

It should also be noted that, as used in this specification and the appended claims, the phrase "configured" describes a system, apparatus, or other structure that is constructed or configured to perform a particular task or adopt a particular configuration. The phrase "configured" can be used interchangeably with other similar phrases such as arranged and configured, constructed and arranged, constructed, manufactured and arranged, and the like.

All publications and patent applications in this specification are indicative of the level of ordinary skill in the art to which this invention pertains. All publications and patent applications are herein incorporated by reference to the same extent as if each individual publication or patent application was specifically and individually indicated by reference.

As used herein, the recitation of numerical ranges by endpoints shall include all numbers subsumed within that range (e.g., 2 to 8 includes 2.1, 2.8, 5.3, 7, etc.).

The headings used herein are provided for consistency with suggestions under 37 CFR 1.77 or otherwise to provide organizational cues. These headings shall not be viewed to limit or characterize the invention(s) set out in any claims that may issue from this disclosure. As an example, although the headings refer to a "Field," such claims should not be limited by the language chosen under this heading to describe the so-called technical field. Further, a description of a technology in the "Background" is not an admission that technology is prior art to any invention(s) in this disclosure. Neither is the "Summary" to be considered as a characterization of the invention(s) set forth in issued claims.

The embodiments described herein are not intended to be exhaustive or to limit the invention to the precise forms disclosed in the following detailed description. Rather, the embodiments are chosen and described so that others skilled in the art can appreciate and understand the principles and practices. As such, aspects have been described with reference to various specific and preferred embodiments and techniques. However, it should be understood that many variations and modifications may be made while remaining within the spirit and scope herein.

The invention claimed is:

1. A method for document creation based on previous document creations, comprising:
   (a) presenting a frame to a user,
      i. wherein the frame comprises a first field and a second field,
      ii. wherein a first group comprises the first field,
      iii. wherein a second group comprises the second field;
   (b) presenting a first portion of a first collection of data,
      i. wherein the first collection of data comprises data that was previously entered into the fields of the frame,
      ii. wherein the first portion of the first collection of data aligns with the first group and the first portion comprises a first field data entry displayed in the first field;
   (c) receiving a denial of the first portion of the first collection for the first group from the user;
   (d) upon receiving a denial, presenting a first portion of a second collection of data for the first group,
      i. wherein the second collection of data comprises data that was previously entered into the fields of the frame,
      ii. wherein the first portion of the second collection of data aligns with the first group and the first portion comprises a first field data entry displayed in the first field;
   (e) after receiving a denial of the first portion of the first collection, receiving a confirmation of the second collection for the first group from the user;
   (f) after receiving the confirmation of the second collection for the first group, presenting a second portion of the first collection of data,
      i. wherein the second portion of the first collection of data aligns with the second group and the second portion comprises a second field data entry displayed in the second field;
   (g) receiving a confirmation of the second portion of the first collection for the second group from the user;
   (h) compiling the confirmed portions of data into a prose output; and
   (i) presenting the prose output to the user through a user interface.

2. The method of claim 1, further comprising: receiving edits to the prose output from the user.

3. The method of claim 1, further comprising: saving confirmed portions of data as a third collection.

4. The method of claim 1, further comprising: receiving a request to present the first portion of the first collection for the first group after previously receiving a denial of the first portion of the first collection for the first group.

5. The method of claim 4, further comprising presenting the first portion of the first collection after receiving the request to present the first portion of the first collection for the first group.

6. The method of claim 1, wherein the data for the first collection was previously entered at a different time than the data for the second collection.

7. The method of claim 1, wherein presenting a first portion of a first collection of data comprises presenting time data associated with the first collection of data, wherein the time data is associated with when the first collection of data was created.

8. The method of claim 1, further comprising: upon receiving a confirmation of the first portion of the second collection of data, removing a second portion of a third collection of data from consideration.

9. The method of claim 1, further comprising recording a non-presentation indicator on a third collection in response to receiving the confirmation of the first portion of the second collection for the first group.

10. A method for data entry, comprising:
    (a) presenting a frame to a user,
       i. wherein the frame comprises a first field, a second field, a third field, and a fourth field,
       ii. wherein a first group of fields comprises the first field and the second field,
       iii. wherein a second group of fields comprises the third field and the fourth field;
    (b) retrieving a first portion of a first collection of data from a collection database, wherein the collection database comprises a plurality of collections of data, each collection of data is divided into portions, each collection of data comprises entries that were previously entered in completing the frame;
    (c) presenting the first portion of the first collection of data,
       i. wherein the first portion of the first collection of data aligns with the first group and the first portion comprises a first field data entry displayed in the first field and a second field data entry displayed in the second field;
    (d) receiving a confirmation of the first portion of the first collection for the first group from the user;
    (e) in response to receiving confirmation of the first group, recording a non-presentation indicator on a second collection from the collection database that inhibits the presentation of any of a second portion of the second collection of data; and
    (f) presenting a second portion of a third collection of data.

11. The method of claim 10, further comprising:
    (g) presenting a second portion of the first collection,
       i. wherein the second portion of the first collection of data aligns with the second group and the second portion comprises a third field data entry display in the third field and a fourth field data entry display in the fourth field;
    (h) receiving a denial of the second portion of the first collection for the second group from the user;
    (i) upon receiving a denial, presenting a second portion of the third collection of data,
       i. wherein the second portion from the third collection of data aligns with the second group and the second portion comprises a third field data entry displayed in the third field and a fourth field data entry displayed in the fourth field;
    (j) after receiving a denial of the second portion of the first collection, receiving a confirmation of the second portion of the third collection for the second group from the user;

(k) compiling confirmed portions of data into a prose output; and
(l) presenting the prose output to the user through a user interface.

12. A method for document creation based on previous document creations, comprising:
   (a) presenting a frame to a user,
      i. wherein the frame comprises a first field and a second field,
      ii. wherein a first group comprises the first field,
      iii. wherein a second group comprises the second field;
   (b) presenting a first portion of a first collection of data,
      i. wherein the first collection of data comprises data that was previously entered into the fields of the frame,
      ii. wherein the first portion of the first collection of data aligns with the first group and the first portion comprises a first field data entry displayed in the first field;
   (c) receiving a denial of the first portion of the first collection for the first group from the user;
   (d) upon receiving a denial, presenting a first portion of a second collection of data for the first group,
      i. wherein the second collection of data comprises data that was previously entered into the fields of the frame,
      ii. wherein the first portion of the second collection of data aligns with the first group and the first portion comprises a first field data entry displayed in the first field;
   (e) receiving a confirmation of the second collection for the first group from the user;
   (f) after receiving the confirmation of the second collection, presenting a second portion of the first collection of data,
      i. wherein the second portion of the first collection of data aligns with the second group and the second portion comprises a second field data entry displayed in the second field;
   (g) receiving a denial of the second portion of the first collection for the second group from the user;
   (h) upon receiving the denial of the second portion of the first collection, presenting a second portion of the second collection of data for the second group,
      i. wherein the second portion from the second collection of data aligns with the second group and the second portion comprises a second field data entry displayed in the second field;
   (i) receiving a denial of the second portion of the second collection for the second group from the user;
   (j) upon receiving the denial of the second portion of the second collection, presenting a third portion of a third collection of data;
      i. wherein the third collection of data comprises data that was previously entered into the fields of the frame,
      ii. wherein the second portion of the third collection of data aligns with the second group and the second portion comprises a second field data entry displayed in the second field;
   (k) receiving a confirmation of the second portion of the third collection for the second group from the user.

13. The method of claim 12, further comprising: receiving edits to the prose output from the user.

14. The method of claim 12, further comprising: saving confirmed portions of data as a fourth collection.

15. The method of claim 12, further comprising: receiving a request to present the first portion of the first collection for the first group after previously receiving a denial of the first portion of the first collection for the first group.

16. The method of claim 15, further comprising presenting the first portion of the first collection after receiving the request to present the first portion of the first collection for the first group.

* * * * *